(12) United States Patent
Olabiyi et al.

(10) Patent No.: US 11,120,353 B2
(45) Date of Patent: Sep. 14, 2021

(54) EFFICIENT DRIVER ACTION PREDICTION SYSTEM BASED ON TEMPORAL FUSION OF SENSOR DATA USING DEEP (BIDIRECTIONAL) RECURRENT NEURAL NETWORK

(71) Applicant: TOYOTA JIDOSHA KABUSHIKI KAISHA, Toyota (JP)

(72) Inventors: Oluwatobi Olabiyi, Mountain View, CA (US); Eric Martinson, Sunnyvale, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 851 days.

(21) Appl. No.: 15/362,720

(22) Filed: Nov. 28, 2016

(65) Prior Publication Data

US 2018/0053108 A1    Feb. 22, 2018

Related U.S. Application Data

(63) Continuation-in-part of application No. 15/238,646, filed on Aug. 16, 2016, now Pat. No. 10,611,379.

(51) Int. Cl.
*G06N 7/00*  (2006.01)
*G06N 20/00*  (2019.01)
(Continued)

(52) U.S. Cl.
CPC ............. *G06N 7/005* (2013.01); *B60W 40/09* (2013.01); *B60W 50/0097* (2013.01);
(Continued)

(58) Field of Classification Search
CPC ...... G06N 3/0445; G06N 20/00; G06N 3/084; G06N 3/08; G06N 3/04; G06N 7/005; H04L 67/12; G06K 9/6288; G06K 9/00791; G06K 9/00845
See application file for complete search history.

(56) References Cited

U.S. PATENT DOCUMENTS 10,366,158 B2    7/2019  Bellegarda et al.
2008/0069437 A1*  3/2008  Baker .................. G06K 9/6256
                                                382/159
(Continued)

FOREIGN PATENT DOCUMENTS

JP        2009-234442      10/2009
JP        2011-53798        3/2011
(Continued)

OTHER PUBLICATIONS

Jain et al., "Recurrent Neural Networks for Driver Activity Anticipation via Sensory-Fusion Architecture," May 2016, IEEE International Conference on Robotics and Automation, pp. 3118-3125 (Year: 2016).*

(Continued)

*Primary Examiner* — Miranda M Huang
*Assistant Examiner* — Catherine F Lee
(74) *Attorney, Agent, or Firm* — Michel Bohn; VLP Law Group LLP

(57) ABSTRACT

By way of example, the technology disclosed by this document may be implemented in a method that includes receiving stored sensor data describing characteristics of a vehicle in motion at a past time and extracting features for prediction and features for recognition from the stored sensor data. The features for prediction may be input into a prediction network, which may generate a predicted label for a past driver action based on the features for prediction. The features for recognition may be input into a recognition network, which may generate a recognized label for the past driver action based on the features for recognition. In some instances, the method may include training prediction network weights of the prediction network using the recognized label and the predicted label.

20 Claims, 19 Drawing Sheets

(51) Int. Cl.
*G06N 3/04* (2006.01)
*B60W 40/09* (2012.01)
*G01C 21/26* (2006.01)
*B60W 50/00* (2006.01)
*G01C 21/32* (2006.01)
*G06N 3/08* (2006.01)

(52) U.S. Cl.
CPC .............. *G01C 21/26* (2013.01); *G01C 21/32* (2013.01); *G06N 3/0445* (2013.01); *G06N 3/084* (2013.01); *G06N 20/00* (2019.01); *B60W 2050/0029* (2013.01); *B60W 2420/42* (2013.01); *B60W 2420/52* (2013.01); *B60W 2420/54* (2013.01); *B60W 2556/55* (2020.02); *B60W 2556/65* (2020.02)

(56) References Cited

U.S. PATENT DOCUMENTS

| | | |
|---|---|---|
| 2011/0081634 A1 | 4/2011 | Kurata et al. |
| 2014/0236386 A1 | 8/2014 | Yoshizawa et al. |
| 2016/0071024 A1* | 3/2016 | Amer ..................... G06N 7/005 706/12 |
| 2018/0053093 A1 | 2/2018 | Olabiyi et al. |

FOREIGN PATENT DOCUMENTS

| | | |
|---|---|---|
| JP | 2011-81431 | 4/2011 |
| JP | 2016-119792 | 6/2016 |
| WO | 2013/042260 | 3/2013 |

OTHER PUBLICATIONS

Morris et al., "Lane Change Intent Prediction for Driver Assistance: On-Road Design and Evaluation," Jun. 2011, IEEE Intelligent Vehicles Symposium, pp. 895-901 (Year: 2011).*

Woellmer et al., "Online Driver Distraction Detection Using Long Short-Term Memory," Jun. 2011, IEEE Transactions on Intelligent Transportation Systems, vol. 12, No. 2, pp. 574-582 (Year: 2011).*
Dong et al., "Characterizing Driving Styles with Deep Learning," Oct. 2016, arXiv:1607.03611v1 [cs.AI], pp. 1-6 (Year: 2016).*
Puskorius et al., "Truncated backpropagation through time and Kalman filter training for neurocontrol," 1994, Proceedings of 1994 IEEE International Conference on Neural Networks, pp. 2488-2493 (Year: 1994).*
Singh et al., "A Multi-Stream Bi-Directional Recurrent Neural Network for Fine-Grained Action Detection," Jun. 2016, 2016 IEEE Conference on Computer Vision and Pattern Recognition (CVPR), pp. 1961-1970 (Year: 2016).*
He et al., "Driving intention recognition and behaviour prediction based on a double-layer hidden Markov model," Journal of Zhejiang University Science, 2012 (10 pages).
Jain et al., "Car that Knows Before You Do: Anticipating Maneuvers Via Learning Temporal Driving Models," Proceedings of the IEEE International Conference on Computer Vision, 2015 (9 pages).
Jain et al., "Recurrent Neural Networks for Driver Activity Anticipation via Sensory-Fusion Architecture," Technical Report, arXiv:1509.05016v1, 2015 (8 pages).
Wikipedia, "Hierarchical temporal memory," retrieved Mar. 25, 2016, from https://en.wikipedia.org/wiki/Hierarchical_temporal_memory (9 pages).
Wikipedia, "Backpropagation," retrieved Mar. 25, 2016, from https://en.wikipedia.org/wiki/Backpropagation (9 pages).
Graves et al., "Framewise Phoneme Classification with Bidirectional LSTM and Other Neural Network Architectures." Neural Networks, vol. 18, No. 5, 2005 (8 pages).
Graves et al., "Hybrid speech recognition with deep bidirectional LSTM." Automatic Speech Recognition and Understanding (ASRU), 2013 IEEE Workshop (6 pages).
Radoslaw et al., Deep Neural Networks predict Hierarchical Spatiotemporal Cortical Dynamics of Human Visual Object Recognition, 2016, MIT, pp. 1-15 (Jan. 12, 2016).

* cited by examiner

EFFICIENT DRIVER ACTION PREDICTION SYSTEM BASED ON TEMPORAL FUSION OF SENSOR DATA USING DEEP (BIDIRECTIONAL) RECURRENT NEURAL NETWORK

CROSS-REFERENCE TO RELATED APPLICATIONS

The present application a continuation-in-part of U.S. patent application Ser. No. 15/238,646, entitled "Integrative Cognition of Driver Behavior", filed Aug. 16, 2016, the entire contents of which is incorporated herein by reference.

BACKGROUND

The present disclosure relates to machine learning. In particular, the present disclosure relates to predicting the actions of users as they relate to a mobile platform. In some instances, the present disclosure relates to anticipating the actions of a specific user driving a vehicle.

Traffic accidents kill over 1.2 million people per year worldwide, and more than 30,000 people die in US alone annually according to the reports from World Health Organization's global status report on road safety and National Highway Traffic Safety Administration. Many of the accidents are caused by risky driving behaviors, which could be preventable if these behaviors could be predicted and drivers warned, and/or compensation strategies were generated in advance, even just a few seconds. Generally, current state-of-the-art driver assistance solutions are unable to provide high-precision driver behavior prediction in a cost-effective manner due to the limitations in their systems/models.

Advance driver assistance systems can benefit from an improved and adaptable driver action prediction (DAP) system. Many of the safety features in today's vehicles, such as automatic breaking and steering, have a mandatory driver response time requirement before the feature can be fully and safely engaged. Being able to predict driver action a few seconds ahead of the action may greatly improve the efficiency and usefulness of such advance driver assistance systems. In particular, an advance driver assistance system that can predict actions further in advance and with greater accuracy will enable new advance driver assistance system functionality, such as automatic turn and braking signals, which can further improve road safety.

Past attempts to predict driver action have suffered from numerous problems. For example, existing technology has a limited prediction performance and is therefore not able to predict actions and events early enough nor are the predictions sufficiently accurate. Some existing technologies treat driver action prediction independently from driver action recognition, so no advantage is taken by training the prediction system using results from the recognition system. Some existing technologies assume that sensor features are relevant for both prediction and recognition. Some existing technologies only use current sensor data and do not provide direct access to the sensor data (e.g., stored sensor data) by the prediction system. Accordingly, existing technologies are limited in efficiency, have access to only a few sensing modalities, and cannot predict actions sufficiently in advance or with sufficient accuracy.

Additionally, while the recognition or detection of a driver action is universal, predicting a driver action ahead of time is highly dependent on individual driving behavior and the environment in which a driver is driving.

Some existing approaches attempt to predict driver behavior using only limited data related to driving. For instance, He L., Zong C., and Wang C., "Driving intention recognition and behavior prediction based on a double-layer hidden Markov model," *Journal of Zhejiang University-SCIENCE C (Computers & Electronics)*, Vol. 13 No 3, 2012, 208-217, describes a double layer Hidden Markov Model (HMM) that includes a lower layer multi-dimensional Gaussian HMM performing activity recognition and an upper layer multi-dimensional discrete HMM performing anticipation. However, this model only considers Controller Area Network (CAN) data such as breaking, accelerating, and steering, and fails to account for important features that affect driving, such as road conditions, location familiarity and steering pattern of a driver. Additionally, this model requires that both the recognition and prediction layers be trained simultaneously, thereby limiting efficiency and performance and assuming features are relevant for both recognition and prediction.

Some approaches require feature extraction before driver behavior recognition and prediction. For instance, Jain, A., Koppula S., Raghavan B., Soh S., and Saxena A., "Car that knows before you do: anticipating maneuvers via learning temporal driving models," *ICCV*, 2015, 3182-3190, considers an elaborate multi-sensory domain for predicting a driver's activity using a Auto-regressive Input-Output HMM (AIO-HMM). In a first step, Jain describes extracting features from input sensor data, such as high-level features from a driver-facing camera to detect a driver's head pose, object features from a road-facing camera to determine a road occupancy status, etc. However, Jain's approach requires a substantial amount of human involvement, which makes it impractical for dynamic systems and possibly dangerous. Further, the number of sensory inputs considered by Jain is not representative of typical human driving experiences, and the model is unable to consider important features affecting driver's action, such as steering patterns, local familiarity, etc.

Some approaches, such as Jain A., Koppula S., Raghavan B., Soh S., and Saxena A., "Recurrent neural networks for driver activity anticipation via sensory-fusion architecture," *arXiv*:1509.05016v1 [cs.CV], 2015, describe using a generic model developed with data from a population of drivers. However, a model like Jain's is unable to adequately model and predict driver behavior and thus reduce the risk of an accident from occurring. In particular, Jain's model is based on a Long-Short Time Memory Recursive Neural Network (LSTM-RNN), and is trained using a backpropagation through time (BPTT) algorithm. However, training this model can be computationally expensive, and memory limitation of the BPTT algorithm can limit the maximum achievable horizon for driver behavior prediction. The model further suffers from a precision vs. recall tradeoff. Moreover, since the model only tries to minimize the anticipation error over the horizon, it offers reduced flexibility on design and embodiment choices.

In particular, the model described in Jain is a traditional spatial multi-sensory fusion architecture, which does not extend to system with a large feature size or a high sampling rate. Further, the prediction accuracy and horizon (time in advance that a prediction can be made) is limited with this model due to the fact that it only uses spatial sensor data fusion. The model does not include an action recognition set, thereby requiring a human to hand label the entire dataset, therefore the model cannot learn to predict an arbitrary driver action without human intervention. Moreover, the model described in Jain can only use a limited number of sensor inputs, such as only steering related modalities, so the number of inputs used by the prediction system are much fewer than those that a human would experience during driving.

Some approaches for using recurrent neural networks, such as bidirectional Long Short Term Memory (Bi-LSTM) recurrent networks, are not adapted for prediction. For instance, A. Graves and J. Schmidhuber, "Framewise Phoneme Classification with Bidirectional LSTM and Other Neural Network Architectures," Neural Networks, vol. 18, no. 5-6, pp. 602-610, July 2005, and A. Graves, N. Jaitly, A. Mohamed "Hybrid Speech Recognition with Deep Bidirectional LSTM", ASRU 2013, consider using Bi-LSTM for speech recognition. However, in these references, the Bi-LSTM treats training and deployment the same. Such a recurrent neural network must be adapted for prediction, because the future sequence of data is not available to the recurrent neural network during deployment. Accordingly, in its current form, the Bi-LSTM of Graves cannot be used for prediction and especially not for driver action prediction.

Accordingly, there is a need for a driver action prediction system that is both high performance and adaptable.

SUMMARY

The specification overcomes the deficiencies and limitations of the approaches described in the background section at least in part by providing novel technology for an efficient driver action prediction system based on temporal fusion of sensor data using a deep (bidirectional) recurrent neural network.

According to one innovative aspect of the subject matter described in this disclosure, a method may include receiving, by one or more computing devices, stored sensor data, the stored sensor data describing characteristics of a vehicle in motion at a past time; extracting, by the one or more computing devices, features for prediction and features for recognition from the stored sensor data; inputting, by the one or more computing devices, the features for prediction into a prediction network; and generating, by the one or more computing devices, a predicted label for a past driver action based on the features for prediction using the prediction network. The method may further include inputting, by the one or more computing devices, the features for recognition into a recognition network; generating, by the one or more computing devices, a recognized label for the past driver action based on the features for recognition using the recognition network; and training, by the one or more computing devices, one or more prediction network weights of the prediction network using the recognized label and the predicted label.

According to another innovative aspect of the subject matter described in this disclose, a system includes one or more computer processors; and one or more non-transitory memories storing instructions that, when executed by the one or more computer processors, cause the computer system to perform operations comprising: receiving stored sensor data, the stored sensor data describing characteristics of a vehicle in motion at a past time; extracting features for prediction and features for recognition from the stored sensor data; inputting the features for prediction into a prediction network; and generating a predicted label for a past driver action based on the features for prediction using the prediction network. The operations may further include inputting the features for recognition into a recognition network; generating a recognized label for the past driver action based on the features for recognition using the recognition network; and training one or more prediction network weights of the prediction network using the recognized label and the predicted label.

Other aspects include corresponding methods, systems, apparatus, and computer programs, configured to perform various actions and/or store various data described in association with these aspects. These and other aspects, such as various data structures, may be encoded on tangible computer storage devices. For instance, one or more of these aspects may include one or more of the following: that the prediction network includes one or more recurrent neural networks; receiving, by the one or more computing devices, current sensor data from one or more sensors, the one or more computing devices being electronically communicatively coupled to the one or more sensors, the current sensor data including data describing characteristics of the vehicle in motion at a present time; extracting, by the one or more computing devices, a current set of features for prediction from the current sensor data; inputting, by the one or more computing devices, the current set of features for prediction into the prediction network; generating, by the one or more computing devices, a predicted future driver action using the one or more prediction network weights, the current set of features for prediction, and the prediction network; that generating the predicted label for the past driver action based on the features for prediction using the prediction network includes inputting, by the one or more computing devices, the features for prediction into a backward sequence processor, inputting, by the one or more computing devices, the features for prediction into a forward sequence processor, fusing, by the one or more computing devices, an output of the backward sequence processor with an output of the forward sequence processor using a temporal fusion processor, and mapping, by the one or more computing devices, an output of the temporal fusion processor to the predicted label for the past driver action using a classifier; that fusing the output of the backward sequence processor with the output of the forward sequence processor includes generating, by the temporal fusion processor operable on the one or more computing devices, a temporal representation using a temporal sequence of the output of the backward sequence processor and a temporal sequence of the output of the forward sequence processor; that generating the recognized label for the past driver action includes inputting, by the one or more computing devices, the features for recognition into one or more pre-trained driver action recognition models; and that training the one or more prediction network weights of the prediction network includes determining an error between the recognized label and the predicted label, and inputting the error into a truncated back-propagation through time algorithm.

According to yet another innovative aspect of the subject matter described in this disclose, a system comprises one or more sensors providing sensor data; one or more non-transitory computer memories for storing and providing access to data; one or more computer processors coupled to the non-transitory computer memories to store and receive data; a feature extraction processor storable by the one or more non-transitory computer memories and executable by the one or more computer processors, the feature extraction processor configured to extract features for recognition from the sensor data and transmit the features for recognition to an action recognition processor; the feature extraction processor configured to extract features for prediction from the sensor data and transmit the features for prediction to an action prediction processor; the action recognition processor storable by the one or more non-transitory computer memories and executable by the one or more computer processors, the action recognition processor configured to generate, by a recognition network, a recognized label for a past user action based on the features for recognition and transmit the recognized label to a training processor; the action prediction processor storable by the one or more non-transitory computer memories and executable by the one or more computer processors, the action prediction processor configured to generate, by a prediction network, a predicted label for the past user action based on the features for prediction and transmit the predicted label to the training processor; and the training processor storable by the one or more non-transitory computer memories and executable by the one or more computer processors; the training processor configured to train, by a training network, one or more prediction network weights of the action prediction processor using the recognized label and the predicted label.

These and other implementations may further include on or more of the following features: that the prediction network includes a forward sequence processor, a backward sequence processor, and a temporal fusion processor; and that each one of the forward sequence processor, the backward sequence processor, and the temporal fusion processor includes a plurality recurrent neural network cells.

Numerous additional features may be included in these and various other implementations, as discussed throughout this disclosure.

The technology of the disclosure is advantageous over other existing solutions in a number of respects. By way of example and not limitation, the technology described herein enables a computing system to provide an efficient driver action prediction system that is high performance, adaptable, and improves utilization of vehicle sensing and computational resources to overcome the limitations of the existing technology described above. For example, some implementations of the technology described herein include a high performance action prediction system based on a deep recurrent neural network that, in some instances, can be trained with various driver action recognition models, may provide access to more sensing modalities, and/or may provide better scalability that previous solutions. These and other implementations, provide technology that may have very high recognition accuracy, a long prediction horizon, very high prediction accuracy, a high number of sensory inputs, may be only moderately complex, may include both online and offline training options, and may be very flexible.

The features and advantages described herein are not all-inclusive and many additional features and advantages will be apparent to one or ordinary skill in the art in view of the figures and description. Moreover it should be noted that the language used in the specification has been selected for readability and instructional purposes and not to limit the scope of the inventive subject matter.

The disclosure is illustrated by way of example, and not by way of limitation in the figures of the accompanying drawings in which like reference numerals are used to refer to similar elements.

DESCRIPTION

The technology described herein may efficiently and effectively model a driver's behavior based on the sensor data capturing the internal and external environments of a moving platform 101. For example, the technology processes information relating to driving, such as data describing a driver's driving habits and familiarity with driving environments, models the processed information, and generates precise driving predictions based on the modeling. In some implementations, the modeling may be based on recognizing spatial and temporal patterns, as discussed further below.

Figure 1:
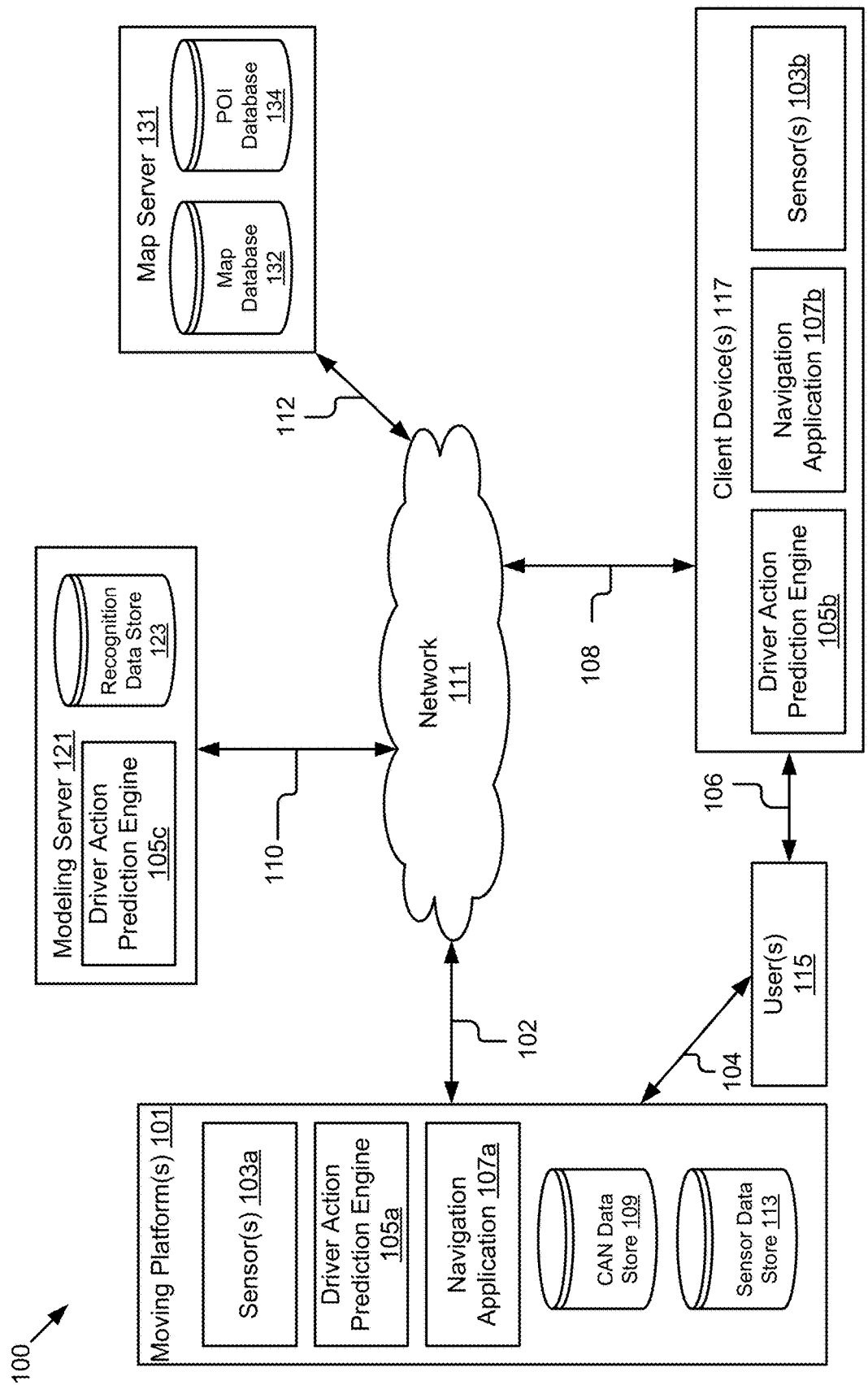
FIG. 1 is a block diagram of an example system for modeling driver behavior.

According to some implementations of this disclosure, a novel driver action prediction engine 105 is described, such as that included in the system 100 depicted in FIG. 1. The driver action prediction engine 105 may be based on temporal fusion of sensor data using a deep (e.g., bidirectional) recurrent neural network. The technology described herein may also include a novel method of training the neural network by generating training labels or targets using simple pre-trained driver action recognition models. In some implementations, the technology may also, or alternatively, incorporate future sensing information into the training of a prediction network 705.

Figure 7A:
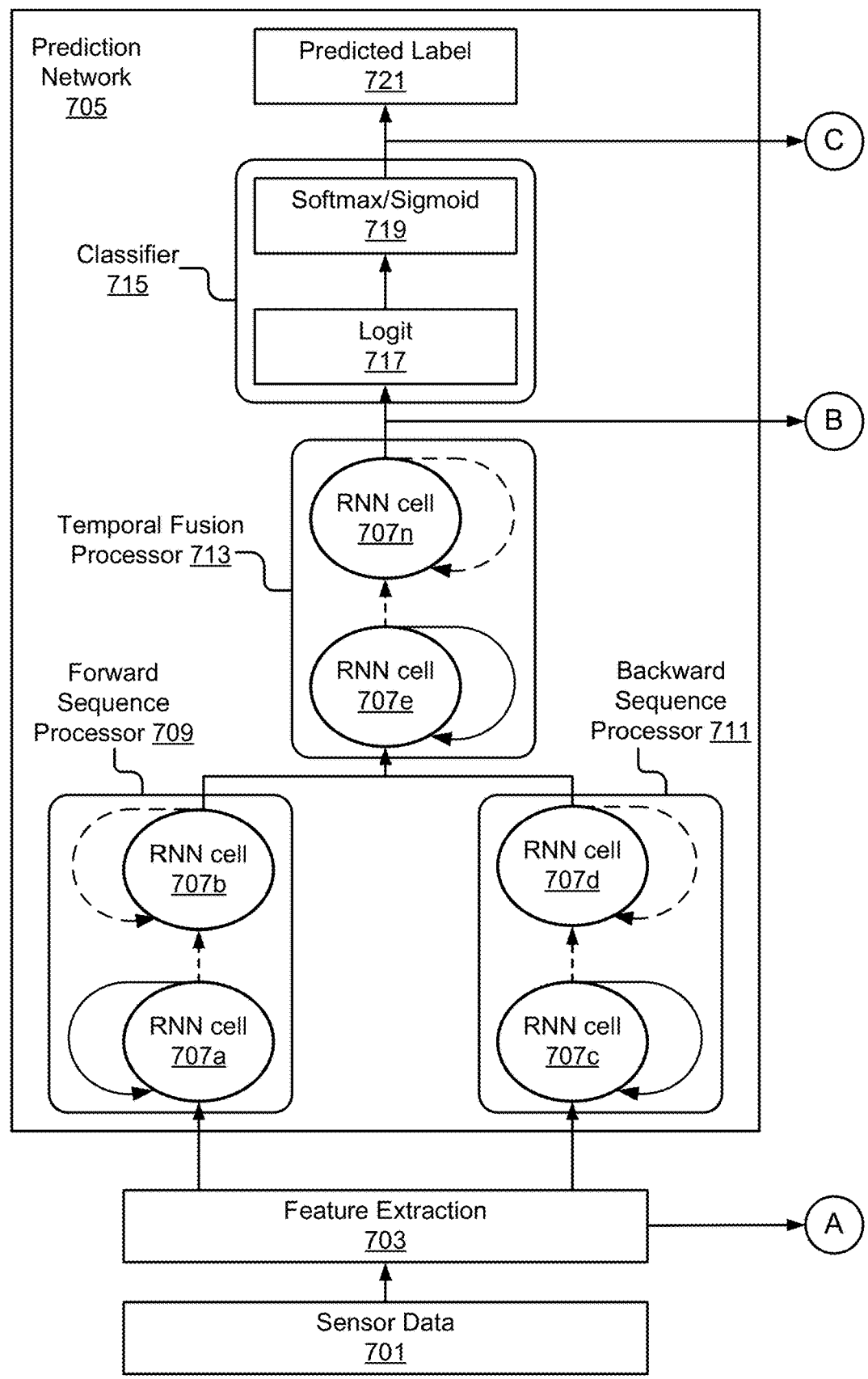
FIG. 7A is a block diagram of an example prediction network.

In some implementations, the driver action prediction engine 105 may train a prediction network, such as the prediction network 705 shown in FIG. 7A, using results from a driver action recognition network (e.g., the driver action recognition network 731), which can substantially reduce and/or eliminate human involvement in training the prediction network 705, and may allow the technology to use many more sensing modalities, as described in further detail elsewhere herein. For instance, the driver action prediction engine 105 may be capable of learning to predict any generally recognizable driver action, which, among other features, may allow the technology to handle large and high frequency sensing modalities without significantly increasing system complexity.

Among the improvements of the techniques described herein, the driver action prediction engine 105 may retrospectively reason over a temporal sequence of sensor data, which allows the system to determine the causes of recognized driver actions, so that when those learned causes occur again in the future, the technology can predict the impending driver action. In particular, while some existing solutions attempt to learn the temporal correlation in a recognized driver action sequence in order to predict future driver actions, the driver action prediction engine 105, according to the techniques described herein, may separate sensor data relevant for action recognition from sensor data relevant for prediction and use the results from several action specific recognition networks 731 to train the prediction network 705.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

While the implementations described herein are often related to driving of vehicle, the technology described herein may be applied to other suitable areas, such as machine operation, train operation, locomotive operation, plane operation, forklift operation, watercraft operation, or operation of any other suitable platforms. Further, it should be understood that while a user 115 may be referred to as a "driver" in some implementations described in the disclosure, the use of the term "driver" should not be construed as limiting the scope of the techniques described in this disclosure.

FIG. 1 is a block diagram of an example advance driver assistance (ADA) system 100. As illustrated, the ADA system 100 may include a modeling server 121, a map server 131, client device(s) 117, and moving platform(s) 101. The entities of the ADA system 100 may be communicatively coupled via a network 111. It should be understood that the ADA system 100 depicted in FIG. 1 is provided by way of example and the ADA system 100 and/or other systems contemplated by this disclosure may include additional and/or fewer components, may combine components, and/or divide one or more of the components into additional components, etc. For example, the ADA system 100 may include any number of moving platforms 101, client devices 117, modeling servers 121, or map servers 131. For instance, additionally or alternatively, the ADA system 100 may include a speech server for receiving and processing speech commands from a user 115, a search server for providing search results matching search queries, vehicle-to-vehicle (V2V) and vehicle-to-infrastructure (V2I) technologies, etc.

The network 111 may be a conventional type, wired and/or wireless, and may have numerous different configurations including a star configuration, token ring configuration, or other configurations. For instance, the network 111 may include one or more local area networks (LAN), wide area networks (WAN) (e.g., the Internet), public networks, private networks, virtual networks, mesh networks among multiple vehicles, peer-to-peer networks, and/or other interconnected data paths across which multiple devices may communicate.

The network 111 may also be coupled to or include portions of a telecommunications network for sending data in a variety of different communication protocols. In some implementations, the network 111 includes Bluetooth® communication networks or a cellular communications network for sending and receiving data including via short messaging service (SMS), multimedia messaging service (MMS), hypertext transfer protocol (HTTP), direct data connection, WAP, email, etc. In some implementations, the network 111 is a wireless network using a connection as DSRC, WAVE, 802.11p, a 3G, 4G, 5G+ network, WiFi™, or any other wireless networks. In some implementations, the network 111 may include a V2V and/or V2I communication network for communicating data among moving platforms 101 and/or infrastructure external to the moving platforms 101 (e.g., traffic or road systems, etc.). Although FIG. 1 illustrates a single block for the network 111 that couples the modeling server 121, the map server 131, the client device(s) 117, and the moving platform(s) 101, it should be understood that the network 111 may in practice comprise any number of combination of networks, as noted above.

The modeling server 121 may include a hardware and/or virtual server that includes processor(s), memory(ies), and network communication capabilities (e.g., communication unit(s)). The modeling server 121 may be communicatively coupled to the network 111, as reflected by signal line 110. In some implementations, the modeling server 121 may send and receive data to and from one or more of the map server 131, the client device(s) 117, and the moving platform(s) 101. In some implementations, the modeling server 121 may include an instance of the driver action prediction engine (DAP engine) 105c and a recognition data store 123, as discussed further elsewhere herein.

The recognition data store 123 may store terminology data for describing a user's actions, such as recognized labels generated by the action recognition processor 255. In FIG. 1, the modeling server 121 is shown as including the recognition data store 123; however, it should be understood that the moving platform(s) 101 and/or the client device(s) 117 may additionally and/or alternatively store the recognition data store 123. For instance, the moving platform(s) 101 and/or the client device(s) 117 may include an instance of the recognition data store 123, may cache data from the recognition data store 123 (e.g., download the recognition data at various intervals), etc. For instance, in some implementations, some recognition data may be pre-stored/installed in the moving platform(s) 101, stored and/or refreshed upon setup or first use, replicated at various intervals, etc. In further implementations, data from the recognition data store 123 may be requested and downloaded at runtime or training. Other suitable variations are also possible and contemplated.

The client device(s) 117 are computing devices that include memory(ies), processor(s), and communication unit(s). The client device(s) 117 are couplable to the network 111 via signal line 108 and may send and receive data to and from one or more of the modeling server 121, the map server 131, and the moving platform(s) 101 (and/or any other components of the system coupled to the network 111). Non-limiting examples of client device(s) 117 include a laptop computer, a desktop computer, a tablet computer, a mobile telephone, a personal digital assistant (PDA), a mobile email device, a roadside sensor, a traffic light, a traffic camera, an embedded system, an appliance, or any other electronic devices capable of processing information and accessing a network 111. In some implementations, the client device(s) 117 may include one or more sensors 103b, a navigation application 107b, and/or a driver action prediction engine 105b.

In some implementations, the client device(s) 117 may include an instance of a navigation application 107b, which may provide navigation instructions to user(s) 115, and/or GPS information to a driver action prediction engine 105. The user(s) 115 may interact with the client device(s) 117, as illustrated by signal line 106. Although FIG. 1 illustrates one client device 117, the ADA system 100 may include a plurality of client devices 117.

The moving platform(s) 101 include computing devices having memory(ies), processor(s), and communication unit(s). Examples of such computing devices may include an electronic control unit (ECU) or other suitable processor, which is coupled to other components of the moving platform(s) 101, such as one or more sensors 103a, actuators, motivators, etc. The moving platform(s) 101 may be coupled to the network 111 via signal line 102, and may send and receive data to and from one or more of the modeling server 121, the map server 131, and the client device(s) 117. In some implementations, the moving platform(s) 101 are capable of transporting people or objects from one point to another. Non-limiting examples of the moving platform(s) 101 include a vehicle, an automobile, a bus, a boat, a plane, a bionic implant, or any other moving platforms with computer electronics (e.g., a processor, a memory or any combination of non-transitory computer electronics). The user(s) 115 may interact with the moving platform(s) 101, as reflected by signal line 104. The user(s) 115 may be a human user operating the moving platform(s) 101. For example, the user(s) 115 may be a driver of a vehicle.

The moving platform(s) 101 may include one or more sensors 103a, a Controller Area Network (CAN) data store 109, a driver action prediction engine 105a, and/or an instance of a navigation application 107a. Although FIG. 1 illustrates one moving platform 101, the ADA system 100 may include a plurality of moving platforms 101. For example, in some implementations, multiple moving platforms 101 may communicate with each other to share sensor data from the sensors 103.

The CAN data store 109 stores various types of vehicle operation data (also sometimes referred to as vehicle CAN data) being communicated between different components of a given moving platform 101 using the CAN, as described elsewhere herein. In some implementations, the vehicle operation data is collected from multiple sensors 103a coupled to different components of the moving platform(s) 101 for monitoring operating states of these components. Examples of the vehicle CAN data include, but are not limited to, transmission, speed, acceleration, deceleration, wheel speed (Revolutions Per Minute—RPM), wheel slip, traction control information, windshield wiper control information, steering angle, braking force, etc. In some implementations, the vehicle operation data may also include location data (e.g., GPS coordinates) describing a current location of the moving platform(s) 101. Other standard vehicle operation data are also contemplated. In some implementations, the CAN data store 109 may be part of a data storage system (e.g., a standard data or database management system) for storing and providing access to data.

The sensor data store 113 may store sensor data from sensor(s) 103 for future retrieval and use by the ADA system 100, for example, during training the stored sensor data may be retrieved from the sensor data store 113 and used to generate prediction labels and/or recognition labels. In some implementations, the sensor data store 113 may be part of a data storage system (e.g., a standard data or database management system) for storing and providing access to data. It should be noted that although the sensor data store 113 is depicted as being on the moving platform 101, it may additionally or alternatively be stored on a client device 117, a modeling server 121, a map server 131, or distributed among these components.

The sensor(s) 103a and/or 103b (also referred to herein as 103) may include any type of sensors suitable for the moving platform(s) 101 and/or the client device(s) 117. The sensor(s) 103 may be configured to collect any type of sensor data suitable to determine characteristics of a moving platform 101, its internal and external environments, and/or a user's actions (e.g., either directly or indirectly). Non-limiting examples of the sensor(s) 103 include various optical sensors (CCD, CMOS, 2D, 3D, light detection and ranging (LIDAR), cameras, etc.), audio sensors, motion detection sensors, barometers, altimeters, thermocouples, moisture sensors, IR sensors, radar sensors, other photo sensors, gyroscopes, accelerometers, speedometers, steering sensors, braking sensors, switches, vehicle indicator sensors, windshield wiper sensors, geo-location sensors, transceivers, sonar sensors, ultrasonic sensors, touch sensors, proximity sensors, any of the sensors associated with the CAN data, as discussed above, etc.

The sensor(s) 103 may also include one or more optical sensors configured to record images including video images and still images of an inside or outside environment of a moving platform 101, record frames of a video stream using any applicable frame rate, encode and/or process the video and still images captured using any applicable methods, and/or capture images of surrounding environments within their sensing range. For instance, in the context of a moving platform 101, the sensor(s) 103a may capture the environment around the moving platform 101 including roads, roadside structure, buildings, trees, dynamic road objects (e.g., surrounding moving platforms 101, pedestrians, road workers, etc.) and/or static road objects (e.g., lanes, traffic signs, road markings, traffic cones, barricades, etc.), etc. In some implementations, the sensor(s) 103 may be mounted to sense in any direction (forward, rearward, sideward, upward, downward, facing etc.) relative to the path of a moving platform 101. In some implementations, one or more sensors 103 may be multidirectional (e.g., LIDAR).

The sensor(s) 103 may additionally and/or alternatively include one or more optical sensors configured to record images including video images and still images of a user's activity (e.g., whether facing toward the interior or exterior of the moving platform 101), record frames of a video stream using any applicable frame rate, and/or encode and/or process the video and still images captured using any applicable methods. For instance, in the context of a moving platform 101, the sensor(s) 103 may capture the user's operation of the moving platform 101 including moving forward, braking, turning left, turning right, changing to a left lane, changing to a right lane, making a U-turn, stopping, making an emergency stop, losing control on a slippery road, etc. In some implementations, the sensor(s) 103 may determine the operations of the moving platform 101 by capturing the user's steering action, braking activities, etc. In one or more implementations, the sensor(s) 103 may capture user's action and activities that are not directly related to the motions of the moving platform(s) 101, such as the user's facial expressions, head directions, hand locations, and other activities that might or might not affect the user's operations of the moving platform(s) 101. As a further example, the image data may reflect an aspect of a moving platform 101 and/or the user 115, such as a series of image frames monitoring a user's head motion for a period of time, etc.

The sensor(s) 103 may optionally include one or more signal receivers configured to record (e.g., in the sensor data store 113), transmit the vehicle information to other surrounding moving platforms 101, and receive information from the other surrounding moving platforms 101, client devices 117, sensors 103 on remote devices, etc. The information received from the other moving platforms 101 may be communicated to other components of the moving platform(s) 101 for further processing, such as to a driver action prediction engine 105.

The processor(s) 213 (e.g., see FIG. 2A) of the moving platform(s) 101, modeling server 121, and/or the client device(s) 117 may receive and process the sensor data from the sensors 103 (or the sensor data store 113). In the context of a moving platform 101, the processor(s) 213 may include an electronic control unit (ECU) implemented in the moving platform 101 such as a vehicle, although other moving platform types are also contemplated. The ECU may receive and store the sensor data as vehicle operation data in the CAN data store 109 for access and/or retrieval by the driver action prediction engine 105. In some instances, the vehicle operation data is directly provided to the driver action prediction engine 105 (e.g., via the vehicle bus, via the ECU, etc., upon being received and/or processed). Other suitable variations are also possible and contemplated. As a further example, one or more sensors 103 may capture a time-varying image data of the user 115 operating a moving platform 101, where the image data depict activities (such as looking left, looking right, moving the right foot from the gasoline pedal to the brake pedal, moving hands around the steering wheel) of the user 115 as the user 115 prepares for a next action while operating the moving platform 101. The driver action prediction engine 105 may receive the sensor data (e.g., real-time video stream, a series of static images, etc.) from the sensor(s) 103 or from the sensor data store 113 (e.g., via the bus, ECU, etc.) and process it to determine what action the user 115 will take in the future, as discussed further elsewhere herein.

The modeling server 121, the moving platform(s) 101, and/or the client device(s) 117 may include instances 105a, 105b, and 105c of the driver action prediction engine 105. In some configurations, the driver action prediction engine 105 may be distributed over the network 111 on disparate devices in disparate locations, in which case the client device(s) 117, the moving platform(s) 101, and/or the modeling server 121 may each include an instance of the driver action prediction engine 105 or aspects of the driver action prediction engine 105. For example, each instance of the driver action prediction engine 105a, 105b, and 105c may comprise one or more of the sub-components depicted in FIG. 2B, and/or different variations of these sub-components, which are discussed in further detail below. In some configurations, the driver action prediction engine 105 may be an application comprising all of the elements depicted in FIG. 2B, for example.

The driver action prediction engine 105 includes computer logic operable to receive or retrieve and process sensor data from the sensor(s) 103, recognize patterns of the sensor data, generate predicted future user actions, and, in some implementations, generate and execute counter measures, such as generate warning(s) and/or implement compensating action to avert risks that might be confronting the user 115, the moving platform(s) 101, and/or associated objects. In some implementations, the driver action prediction engine 105 may be implemented using software executable by one or more processors of one or more computer devices, using hardware, such as but not limited to a field-programmable gate array (FPGA), an application-specific integrated circuit (ASIC), etc., and/or a combination of hardware and software, etc. The driver action prediction engine 105 is described below in more detail.

The navigation application 107 (e.g., one or more of the instances 107a or 107b) includes computer logic operable to provide navigation instructions to a user 115, display information, receive input, etc. In some implementations, the navigation application 107 may be implemented using software executable by one or more processors of one or more computer devices, using hardware, such as but not limited to a field-programmable gate array (FPGA), an application-specific integrated circuit (ASIC), etc., and/or a combination of hardware and software, etc.

The navigation application 107 may utilize data from the sensor(s) 103, such as a geo-location transceiver (e.g., GPS transceiver, cellular radio, wireless radio, etc.), configured to receive and provide location data (e.g., GPS, triangulation, cellular triangulation, etc.) for a corresponding computing device, sensors 103 (e.g., as sensor data), etc. For example, the moving platform(s) 101 and/or the client device(s) 117 may be equipped with such a geo-location transceiver and the corresponding instance of the navigation application 107 may be configured to receive and process location data from such a transceiver. The navigation application 107 is discussed in further detail below.

The map server 131 includes a hardware and/or virtual server having a processor, a memory, and network communication capabilities. In some implementations, the map server 131 receives and sends data to and from one or more of the modeling server 121, the moving platform(s) 101, and the client device(s) 117. For example, the map server 131 sends data describing a map of a geo-spatial area to one or more of the integrative cognition engine 105 and the navigation application 107. The map server 131 is communicatively coupled to the network 111 via signal line 112. In some implementations, the map server 131 may include a map database 132 and a point of interest (POI) database 134.

The map database 132 stores data describing maps associated with one or more geographic regions, which may be linked with time and/or other sensor data and used/included as sensor data. In some implementations, map data may describe the one or more geographic regions at street level. For example, the map data may include information describing one or more lanes associated with a particular road. More specifically, the map data may describe the direction of travel of a road, the number of lanes on that road, exits and entrances to that road, whether one or more lanes have special status (e.g., are carpool lanes), the condition of the road in those lanes, traffic and/or accident data for those lanes, traffic controls associated with those lanes, (e.g., lane markings, pavement markings, traffic signals, traffic signs, etc.), etc. In some implementations, the map database 132 may include and/or be associated with a database management system (DBMS) for storing and providing access to data.

The point of interest (POI) database 134 stores data describing (POIs) for various geographic regions. For example, the POI database 134 stores data describing tourist attraction, hotels, restaurants, gas stations, university stadiums, landmarks, etc., along various road segments. In some implementations, the POI database 134 may include a database management system (DBMS) for storing and providing access to data.

It should be understood that the ADA system 100 illustrated in FIG. 1 is representative of an example system and that a variety of different system environments and configurations are contemplated and are within the scope of the present disclosure. For instance, various acts and/or functionality may be moved from a modeling server 121, to a client device 117, to a moving platform 101, or otherwise, data may be consolidated into a single data store or further segmented into additional data stores, and some implementations may include additional or fewer computing devices, servers, and/or networks, and may implement various functionality client or server-side. Further, various entities of the system may be integrated into a single computing device or system or divided into additional computing devices or systems, etc.

Figure 2A:
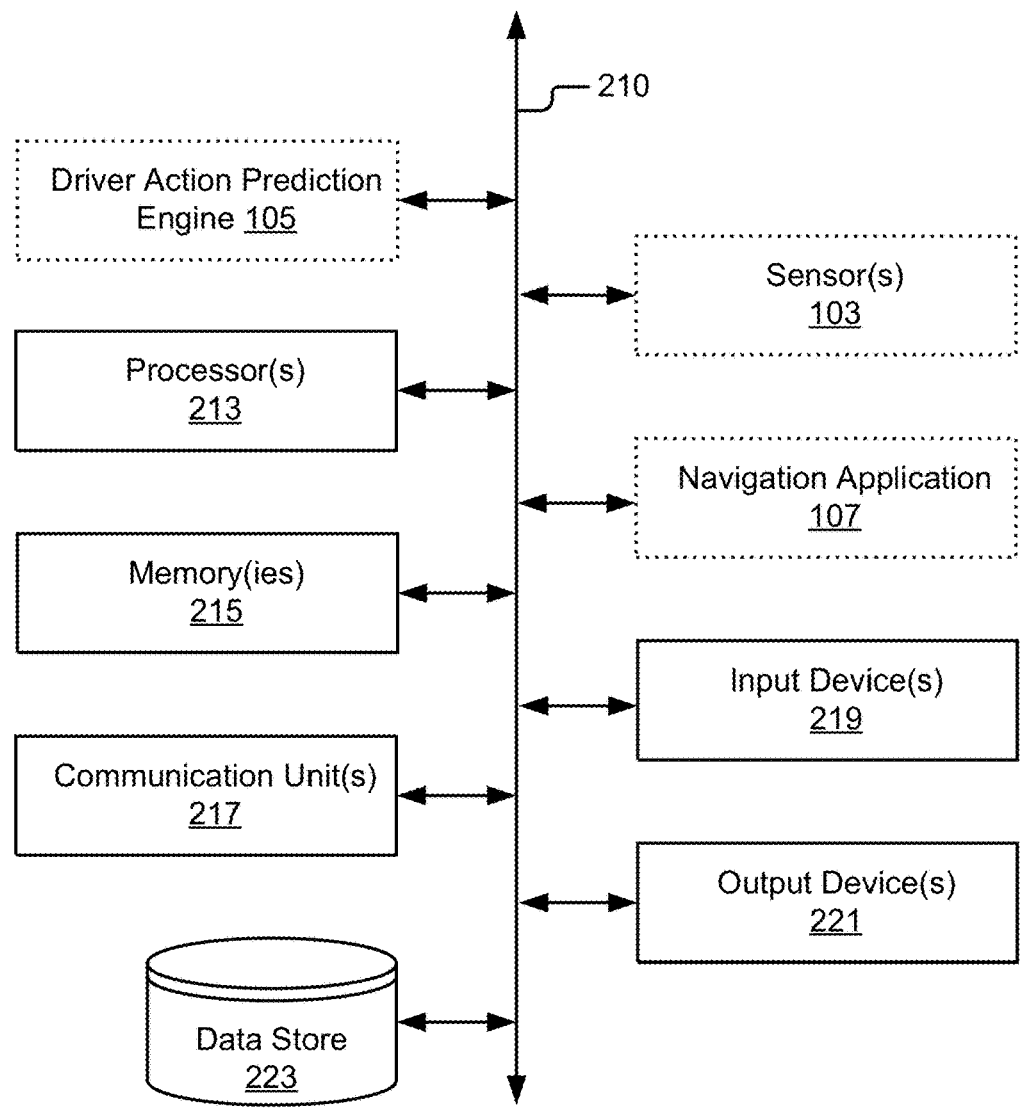
FIG. 2A is a block diagram of an example computing device.

FIG. 2A is a block diagram of an example computing device 200, which may represent the architecture of a modeling server 121, a client device 117, a moving platform 101, or a map server 131.

As depicted, the computing device 200 includes one or more processors 213, one or more memories 215, one or more communication units 217, one or more input devices 219, one or more output devices 221, and one or more data stores 223. The components of the computing device 200 are communicatively coupled by a bus 210. In some implementations where the computing device 200 represents the server 101, the client device(s) 117, or the moving platform(s) 101, the computing device 200 may include one or more driver action prediction engines 105, one or more sensors 103, and/or one or more navigation applications 107, etc.

The computing device 200 depicted in FIG. 2A is provided by way of example and it should be understood that it may take other forms and include additional or fewer components without departing from the scope of the present disclosure. For example, while not shown, the computing device 200 may include various operating systems, software, hardware components, and other physical configurations.

In some implementations where the computing device 200 is included or incorporated in moving platform(s) 101, the computing device 200 may include and/or be coupled to various platform components of the moving platform(s) 101, such as a platform bus (e.g., CAN, as described in reference to FIG. 8E), one or more sensors 103, such as, automotive sensors, acoustic sensors, video sensors, chemical sensors, biometric sensors, positional sensors (e.g., GPS, compass, accelerometer, gyroscope, etc.), switches, and controllers, cameras, etc., an internal combustion engine, electric motor, drivetrain parts, suspension components, instrumentation, climate control, and/or any other electrical, mechanical, structural, and mechanical components of the moving platform(s) 101. In these implementations, the computing device 200 may embody, be incorporated in, or include an ECU, ECM, PCM, etc. In further implementations, the computing device 200 may include an embedded system embedded in a moving platform 101.

The processor(s) 213 may execute software instructions by performing various input/output, logical, and/or mathematical operations. The processor(s) 213 may have various computing architectures to process data signals including, for example, a complex instruction set computer (CISC) architecture, a reduced instruction set computer (RISC) architecture, and/or an architecture implementing a combination of instruction sets. The processor(s) 213 may be physical and/or virtual, and may include a single core or plurality of processing units and/or cores. In some implementations, the processor(s) 213 may be capable of generating and providing electronic display signals to a display device (not shown), supporting the display of images, capturing and transmitting images, performing complex tasks including various types of feature extraction and sampling, etc. In some implementations, the processor(s) 213 may be coupled to the memory(ies) 215 via the bus 210 to access data and instructions therefrom and store data therein. The bus 210 may couple the processor(s) 213 to the other components of the computing device 200 including, for example, the memory(ies) 215, the communication unit(s) 217, the sensor(s) 103, the integrative cognition engine 105, the navigation application 107, the input device(s) 219, the output device(s) 221, and/or and the data store 223.

The memory(ies) 215 may store and provide access to data to the other components of the computing device 200. In some implementations, the memory(ies) 215 may store instructions and/or data that may be executed by the processor(s) 213. For example, depending on the configuration of the computing device 200, the memory(ies) 215 may store one or more instances of the driver action prediction engine 105 and/or one or more instances of the navigation application 107. The memory(ies) 215 are also capable of storing other instructions and data, including, for example, various data described elsewhere herein, an operating system, hardware drivers, other software applications, databases, etc. The memory(ies) 215 may be coupled to the bus 210 for communication with the processor(s) 213 and the other components of computing device 200.

The memory(ies) 215 include one or more non-transitory computer-usable (e.g., readable, writeable, etc.) media, which may be any tangible non-transitory apparatus or device that may contain, store, communicate, propagate or transport instructions, data, computer programs, software, code, routines, etc., for processing by or in connection with the processor(s) 213. In some implementations, the memory(ies) 215 may include one or more of volatile memory and non-volatile memory. For example, the memory(ies) 215 may include, but are not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 215 may be a single device or may include multiple types of devices and configurations.

The communication unit(s) 217 transmit data to and receive data from other computing devices to which they are communicatively coupled (e.g., via the network 111) using wireless and/or wired connections. The communication unit(s) 217 may include one or more wired interfaces and/or wireless transceivers for sending and receiving data. The communication unit(s) 217 may couple to the network 111 and communicate with other computing nodes, such as client device(s) 117, moving platform(s) 101, and/or server(s) 121 or 131, etc. (depending on the configuration). The communication unit(s) 217 may exchange data with other computing nodes using standard communication methods, such as those discussed above.

The bus 210 may include a communication bus for transferring data between components of a computing device 200 or between computing devices, a network bus system including the network 111 and/or portions thereof, a processor mesh, a combination thereof, etc. In some implementations, the bus 210 may represent one or more buses including an industry standard architecture (ISA) bus, a peripheral component interconnect (PCI) bus, a universal serial bus (USB), or some other bus known to provide similar functionality. Additionally and/or alternatively, the various components of the computing device 200 may cooperate and communicate via a software communication mechanism implemented in association with the bus 210. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The data store 223 includes non-transitory storage media that store data. A non-limiting example non-transitory storage medium may include a dynamic random access memory (DRAM) device, a static random access memory (SRAM) device, flash memory, a hard disk drive, a floppy disk drive, a disk-based memory device (e.g., CD, DVD, Blu-ray™, etc.), a flash memory device, or some other known, tangible, volatile or non-volatile storage devices. Depending on the computing device 200 represented by FIG. 2A, the data store 223 may represent one or more of the CAN data store 109, the recognition data store 123, the POI database 134, the map database 132, and the sensor data store 113, although other data store types are also possible and contemplated.

The data store 223 may be included in the one or more memories 215 of the computing device 200 or in another computing device and/or storage system distinct from but coupled to or accessible by the computing device 200. In some implementations, the data store 223 may store data in association with a DBMS operable by the modeling server 121, the map server 131, the moving platform(s) 101, and/or the client device(s) 117. For example, the DBMS could include a structured query language (SQL) DBMS, a NoSQL DMBS, etc. In some instances, the DBMS may store data in multi-dimensional tables comprised of rows and columns, and manipulate, e.g., insert, query, update and/or delete, rows of data using programmatic operations.

The input device(s) 219 may include any standard devices configured to receive a variety of control inputs (e.g., gestures, voice controls) from a user 115 or other devices. Non-limiting example input device 219 may include a touch screen (e.g., LED-based display) for inputting texting information, making selection, and interacting with the user 115; motion-detecting input devices; audio input devices; other touch-based input devices; keyboards; pointer devices; indicators; and/or any other inputting components for facilitating communication and/or interaction with the user 115 or the other devices. The input device(s) 219 may be coupled to the computing device 200 either directly or through intervening controllers to relay inputs/signals received from users 115 and/or sensor(s) 103.

The output device(s) 221 may include any standard devices configured to output or display information to a user 115 or other devices. Non-limiting example output device(s) 221 may include a touch screen (e.g., LED-based display) for displaying navigation information to the user 115, an audio reproduction device (e.g., speaker) for delivering sound information to the user 115, a display/monitor for presenting texting or graphical information to the user 115, etc. The outputting information may be text, graphic, tactile, audio, video, and other information that may be understood by the user 115 or the other devices, or may be data, logic, programming that can be readable by the operating system of the moving platform(s) 101 and/or other computing devices. The output device(s) 221 may be coupled to the computing device 200 either directly or through intervening controllers.

Figure 2B:
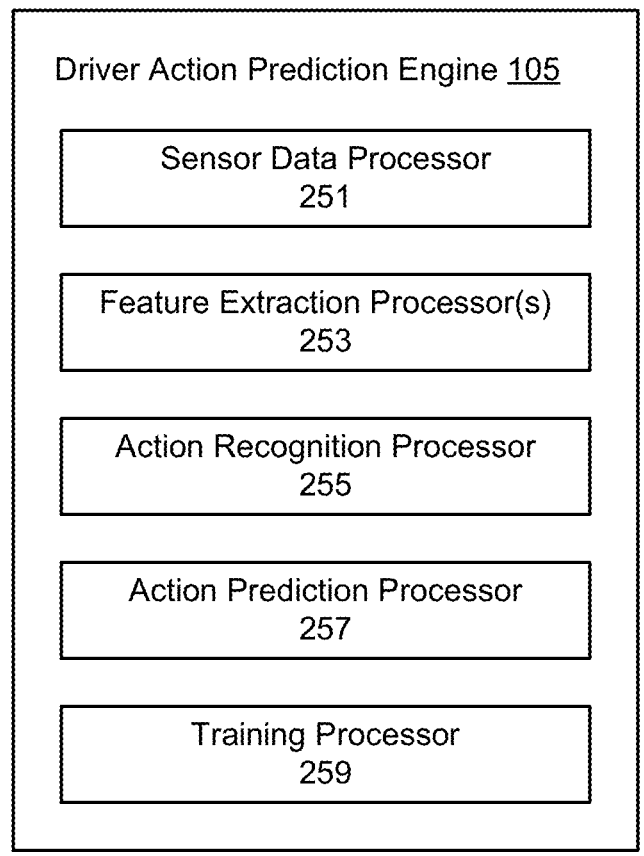
FIG. 2B is a block diagram of an example driver action prediction engine.

FIG. 2B is a block diagram of an example driver action prediction engine 105. As illustrated, the integrative cognition engine 105 may include various subcomponents, such as a sensor data processor 251, feature extraction processor(s) 253, an action recognition processor 255, an action prediction processor 257, and/or a training processor 259.

The sensor data processor 251, the feature extraction processor(s) 253, the action recognition processor 255, the action prediction processor 257, and/or the training processor 259 may be implemented as software, hardware, or a combination of the foregoing. In some implementations, the sensor data processor 251, the feature extraction processor(s) 253, the action recognition processor 255, the action prediction processor 257, and/or the training processor 259 may be communicatively coupled by the bus 210 and/or the processor(s) 213 to one another and/or the other components of the computing device 200. In some implementations, one or more of the components 251, 253, 255, 257, and 259 are sets of instructions executable by the processor(s) 213. In further implementations, one or more of the components 251, 253, 255, 257, and 259 are storable in the memory(ies) 215 and are accessible and executable by the processor(s) 213. In any of the foregoing implementations, these components 251, 253, 255, 257, and 259 may be adapted for cooperation and communication with the processor(s) 213 and other components of the computing device 200.

The sensor data processor 251 may include computer logic operable to process sensor data for input into the feature extraction processor(s) 253. In some implementations, the sensor data processor 251 handles the sensors 103 relating to the mobile platform 101 environment, such as inside or outside of a vehicle, a driver's actions, sensing information pertaining to the vehicle by other mobile platforms or by infrastructural sensors (e.g., road sensors, traffic sensors, etc.). The sensor data processor 251 may filter, structure, and/or format the sensor data for pattern recognition performed by the feature extraction processor(s) 253. In some implementations, sensor data produced by the sensor(s) 103 may include noise and/or unnecessary information. The sensor data processor 251 may analyze the received sensor data and remove the noise and/or unnecessary information of the sensor data. In some implementations, sensor data received by the sensor(s) 103 may contain different features and/or formats. The sensor data processor 251 may filter various features and/or normalize these different formats to be compatible with the feature extraction processor(s) 253.

The sensor data processor 251 may be coupled to the sensor(s) 103, the data store 223, and/or other components of the computing device 200 to receive sensor data associated with a moving platforms 101. In some implementations, the sensor data processor 251 may receive sensor data associated with the moving platform(s) 101 from sensors 103 and/or the sensor data store 113 and then process the received sensor data, as discussed elsewhere herein. After data processing, the sensor data processor 251 may pass the processed sensor data to the feature extraction processor(s) 253 or may store the data in non-transitory memory (e.g., the sensor data store 113) for retrieval by the other components of the driver action prediction engine 105. In some implementations, sensor data may be handled by the feature extraction processor(s) 253 without processing, and the sensor data processor 251 may therefore directly pass the received sensor data to the feature extraction processor(s) 253 or the feature extraction processor(s) 253 may receive the sensor data directly.

The feature extraction processor(s) 253 may include computer logic operable to extract features from the sensor data. In some implementations, the feature extraction processor(s)

253 may extract features that can be used independently to recognize and/or predict user actions. In some implementations, the feature extraction processor(s) 253 may extract features from sensor data received directly from the sensors 103, the sensor data processor 251, and/or the sensor data store 113. For example, the feature extraction processor(s) 253 may have direct access to stored sensor data and/or sensor data as it is being received from the sensors 103.

Some past technologies assumed that features in sensor data are relevant for both prediction and recognition; however, in some implementations of the techniques described herein, the feature extraction processor(s) 253 may extract features for recognition and extract features for prediction independently, as described elsewhere herein.

The feature extraction processor(s) 253 may be adapted for cooperation and communication with the processor(s) 213, the memory(ies) 215, and/or other components of the computing device 200 via the bus 210. In some implementations, the feature extraction processor(s) 253 may store data, such as features for prediction and/or features for recognition in a data store 223 and/or transmit the features to one or more of the other components of the driver action prediction engine 105. For example, the feature extraction processor(s) 253 may be coupled to the action recognition processor 255 to output features for recognition and to the action prediction processor 257 to output the features for prediction.

The action recognition processor 255 may include computer logic operable to recognize actions based on sensor data and/or features. In some implementations, the action recognition processor 255 runs a recognition network 731 on the features extracted for recognition (e.g., received directly from the feature extraction processor(s) 253, the data store 223, etc.) in order to recognize user actions. In some implementations, the recognition network 731 may include an algorithmic model component of the action recognition processor 255 that recognizes or detects user actions from extracted features or sensor data. For example, the ADA system 100 may use the recognition network 731 to generate labels for training the prediction network 705 based on sensed user actions. The use of the recognition network 731 is particularly advantageous over past technology that used only human labelers to generate labels for user actions. The recognition network 731 is described in further detail elsewhere herein, for example, in reference to FIG. 7B.

The action prediction processor 257 may include computer logic operable to predict actions based on sensor data and/or features. In some implementations, the action prediction processor 255 runs a prediction network 705 on the features extracted for prediction (e.g., received directly from the feature extraction processor(s) 253, the data store 223, etc.) in order to predict user actions. For example, in some instances, the action prediction processor 257 continuously predicts future driver action by running the prediction network model 705 on the features extracted for prediction as the features are received in real-time.

In some implementations, the prediction network 705 may include an algorithmic model component of the action prediction processor 257 that recognizes or detects driver actions from extracted features or sensor data. For example, the prediction network 705 may use temporal fusion of sensor data or features extracted for prediction using a deep recurrent neural network, although other suitable approaches are also possible and contemplated herein. The prediction network 705 is described in further detail elsewhere herein, for example, in reference to FIG. 7A.

The training processor 259 may include computer logic operable to train the prediction model and/or the weights thereof, for example. In some implementations, the training processor 259 runs a training network 761 on the outputs of the action recognition processor 255 and/or the action prediction processor 257 (e.g., received directly from the processor 255 and/or 257, the data store 223, etc.). In some implementations, the training processor 259 may combine (e.g., retroactively) the features extracted for prediction and a recognized action label to generate training examples, which are then used to train the prediction network model 705.

According to some implementations of the techniques described herein, only the prediction network 705 may be updated during training without affecting the recognition network 731, whereas some past technology has required updating both recognition and prediction models simultaneously, thereby increasing system complexity and consumed computational resources.

In some implementations, the training network 761 may include an algorithmic model component of the training processor 259. It should be noted that although the prediction network 705 can be trained using human generated labels for user actions, one of the key advantages of the proposed system is the ease of training the prediction network 705 using the labels generated by the recognition network 731. The training network 761 is described in further detail elsewhere herein, for example, in reference to FIG. 7C.

Figure 3A:
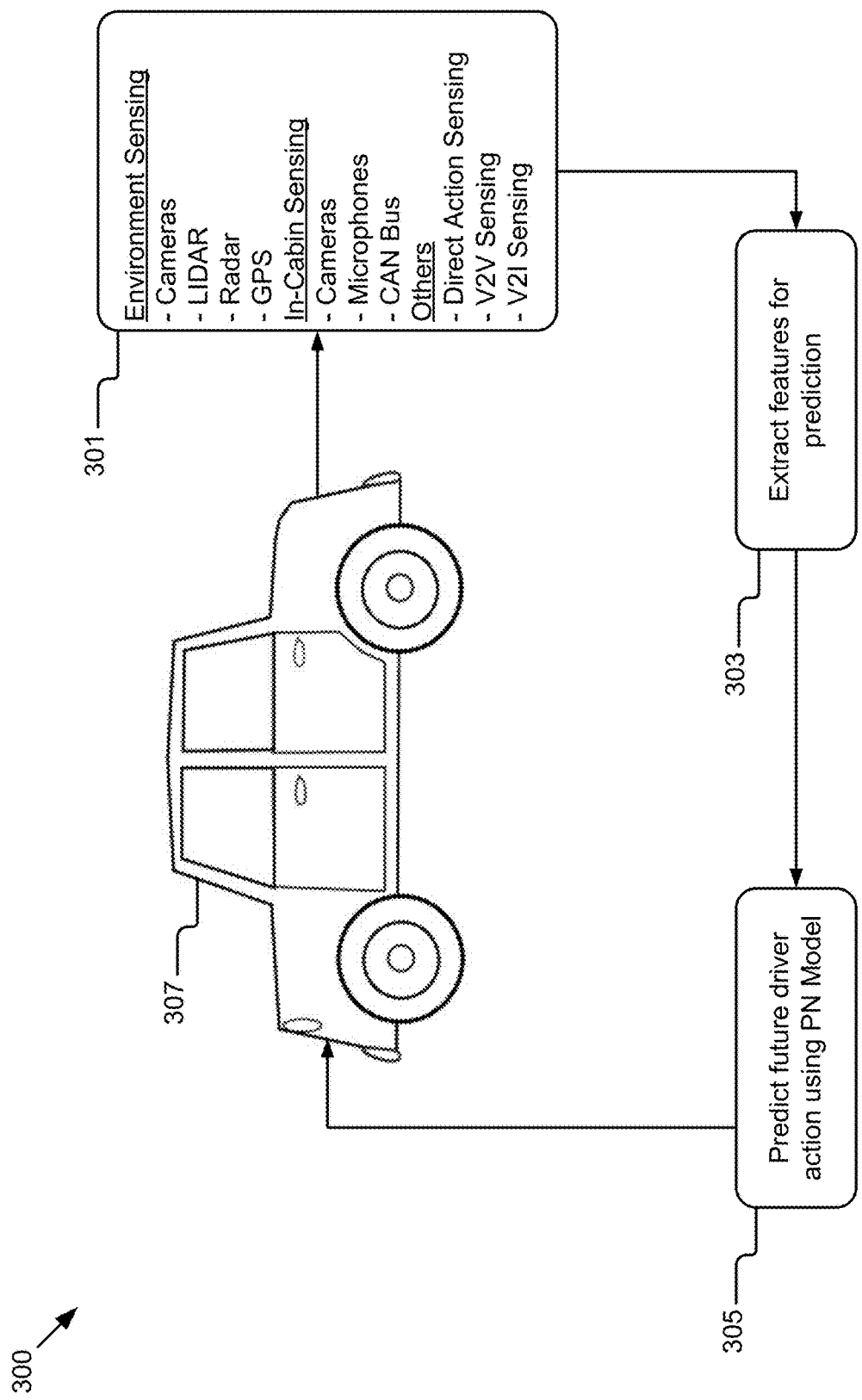
FIG. 3A is a block diagram of an example deployment of the driver action prediction engine.

FIG. 3A is a block diagram 300 of an example deployment of the driver action prediction engine 105 (not shown). In the example depicted in the diagram 300, the driver action prediction engine 105 may receive sensor data 301, which may be provided by sensors 103 (not shown) associated with a moving platform 101, such as the vehicle 307. The sensor data 301 may include environment sensing data, in-cabin sensing data, or other types of sensing data. For example, environment sensing data may include cameras (e.g., externally facing), LIDAR, Radar, GPS, etc.; in-cabin sensing data may include cameras (e.g., internally facing), microphones, CAN bus data (e.g., as described elsewhere herein), etc.; and the other types of data may include direct action sensing (e.g., direct sensors of user actions), V2V sensing (e.g., sensor data provided from one vehicle to another vehicle), V2I sensing (e.g., sensor data provided by infrastructure, such as roads or traffic sensors, etc.), etc.

The feature extraction processor(s) 253 may then, at 303, extract features for prediction based on the sensor data 301. At 305, the action prediction processor 255 predicts a future driver action using the prediction network model 705, as describe elsewhere herein, for example, in reference to FIG. 7A. In some implementations, the predicted future driver action may be returned to other systems of the vehicle 307 to provide actions (e.g., automatic steering, braking, signaling, etc.) or warnings (e.g., alarms for the driver).

Figure 3B:
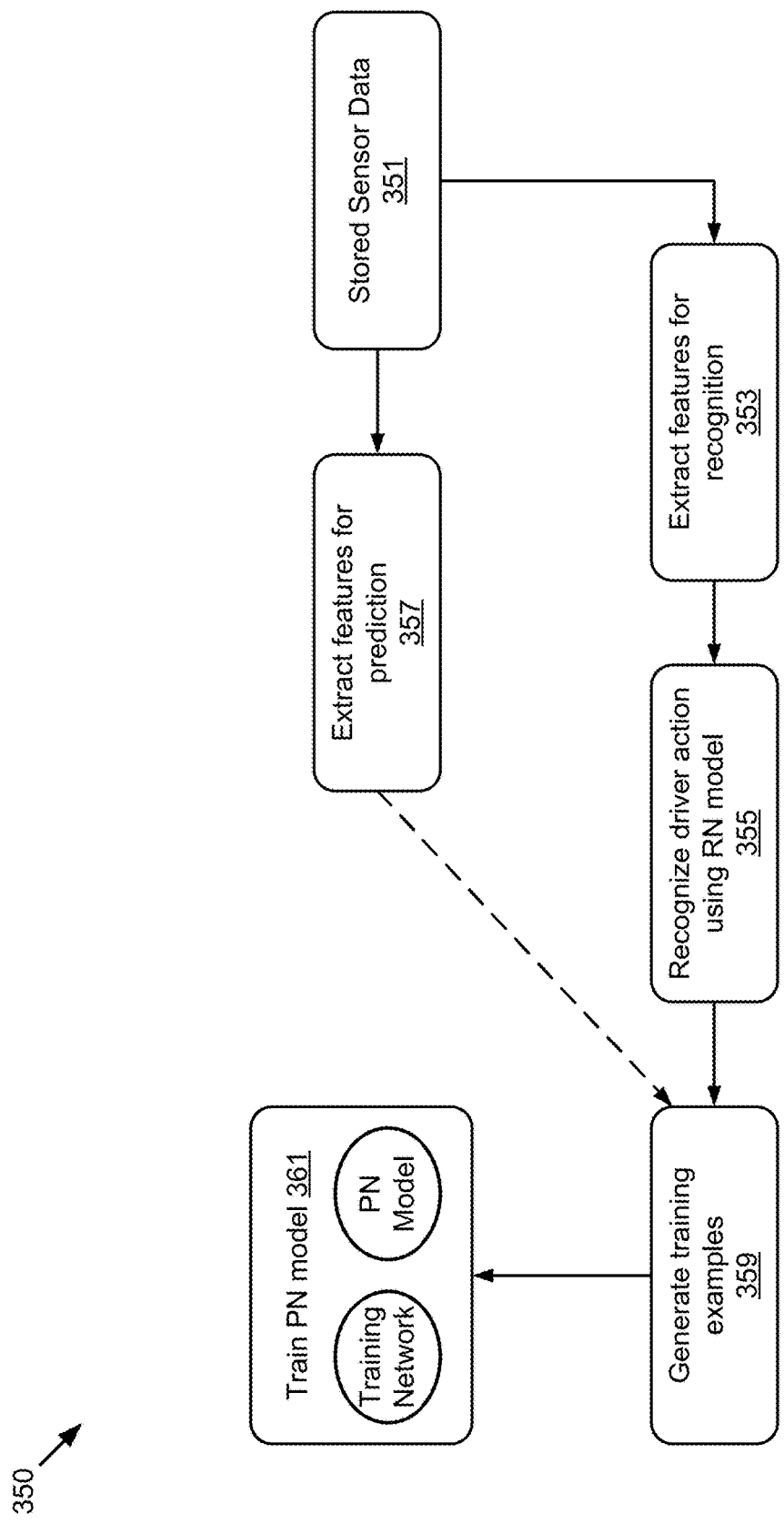
FIG. 3B is a block diagram of an example implementation for training the driver action prediction engine.

FIG. 3B is a block diagram 350 of an example of the driver action prediction engine 105 in training. In the example depicted in block diagram 350, the feature extraction processor(s) 253 may receive or retrieve the stored sensor data (e.g., sensor data collected at a past time) at 351. The feature extraction processor(s) 253 may extract features for recognition at 353 from the stored sensor data and, at 355, recognize driver actions using the recognition network model 731 (e.g., as described in reference to FIG. 7B). Additionally, the feature extraction processor(s) 253 may extract features for prediction at 357. At 359, the training processor 259 may generate training examples using the features extracted for prediction and the recognized driver actions and, at 361, may train the prediction network model 705 using the training network 761, as described elsewhere herein, for example in reference to FIG. 7C.

Figure 4:
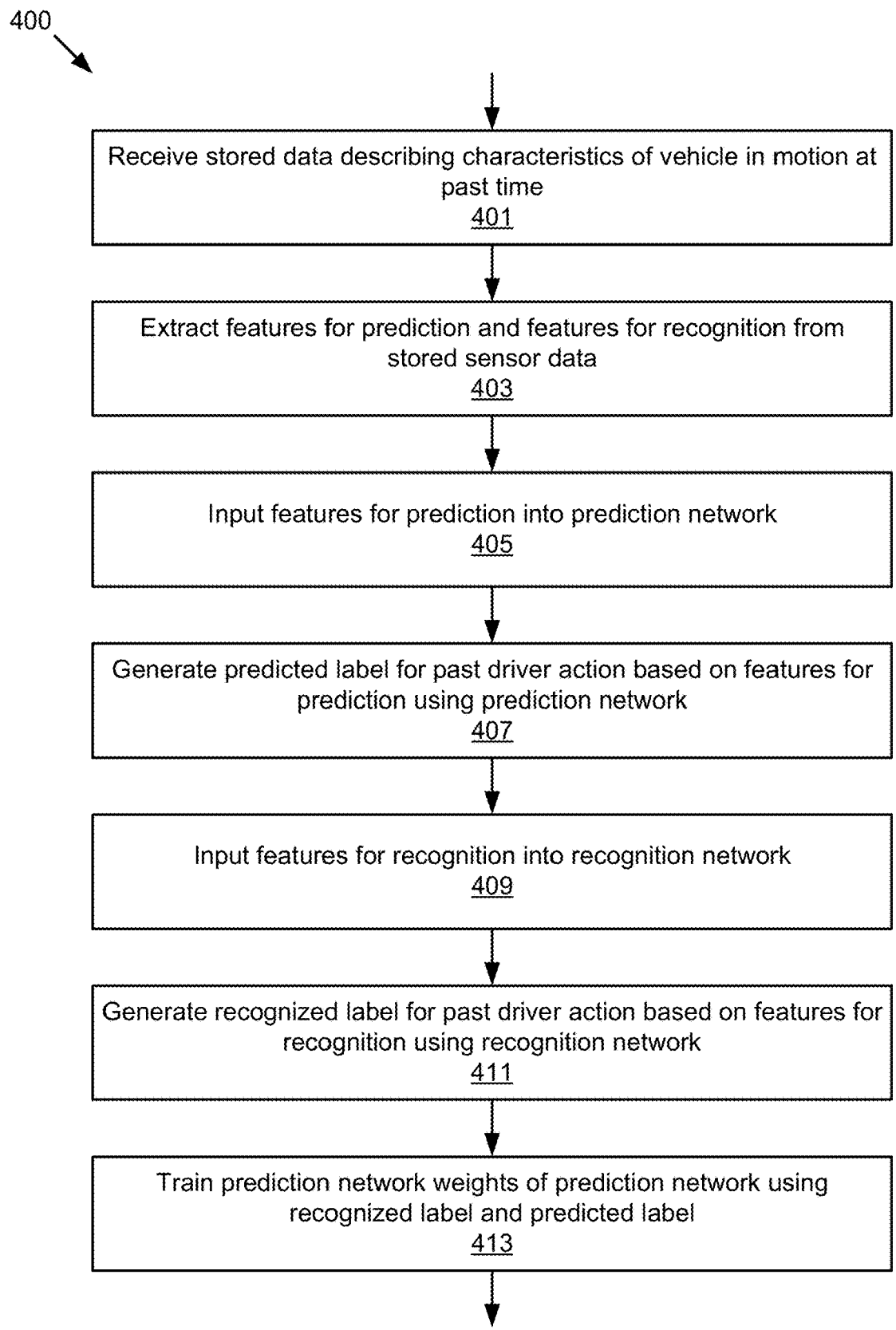
FIG. 4 is a flowchart of an example method for training a driver action prediction engine.

FIG. 4 is a flowchart of an example method 400 for training a driver action prediction engine 105. At 401, the sensor data processor 251 or the feature extraction processor(s) 253 may receive stored data (e.g., stored in sensors 103 or in the sensor data store 113) describing characteristics of a vehicle in motion at a past time. For example, sensor data may have been recorded (e.g., by the sensor data processor 251) and linked over a past time period when a vehicle, such as the moving platform 101 described elsewhere herein, recorded sensor data (potentially when moving, receiving driver actions, etc.). The sensor data may describe driver actions and/or environmental factors that may cause those driver actions.

At 403, the feature extraction processor(s) 253 may extract features for prediction and/or features for recognition from the stored sensor data. In some implementations, the features for prediction and features for recognition may be the same or different features or a combination thereof. For example, features for recognition may include that the driver is driving straight at a constant speed and then immediately slams on the brakes while features for prediction may include that the driver is driving straight at a constant speed and that another vehicle turns in front of the vehicle of the driver.

At 405, the action prediction processor 257 may input the features for prediction into a prediction network 705 (e.g., which may include one or more recurrent neural networks), and at 407, the action prediction processor 257 may generate one or more predicted labels (e.g., a predicted label may describe one or more predicted driver actions) for the past driver action based on the features for prediction using the prediction network 705, for example as described in reference to FIG. 7A.

At 409, the features for recognition may be may be input into a recognition network 731 (e.g., by action recognition processor 255), and at 411, generate a recognized label for the past driver action based on the features for recognition using the recognition network 731. In some implementations, the action recognition processor 255 generates the recognized label for the past driver action by inputting the features for recognition into one or more pre-trained driver action recognition models. For example, the pre-trained driver action recognition models may include thresholds, a SVM (support vector machine), a Logit (e.g., logit regression model), or a shallow (C)NN (convolutional neural network), etc.

At 413, the training processor 259 may train prediction network weights of the prediction network 705 using the recognized label and the predicted label. For example, training the one or more prediction network weights of the prediction network 705 may include determining an error between the recognized label and the predicted label. In some implementations, the training processor 259 may then determine the weight(s) by inputting the determined error into a truncated back-propagation through time algorithm. In some implementations, the training is performed using the example training network 761 described in reference to FIG. 7C.

Figure 5:
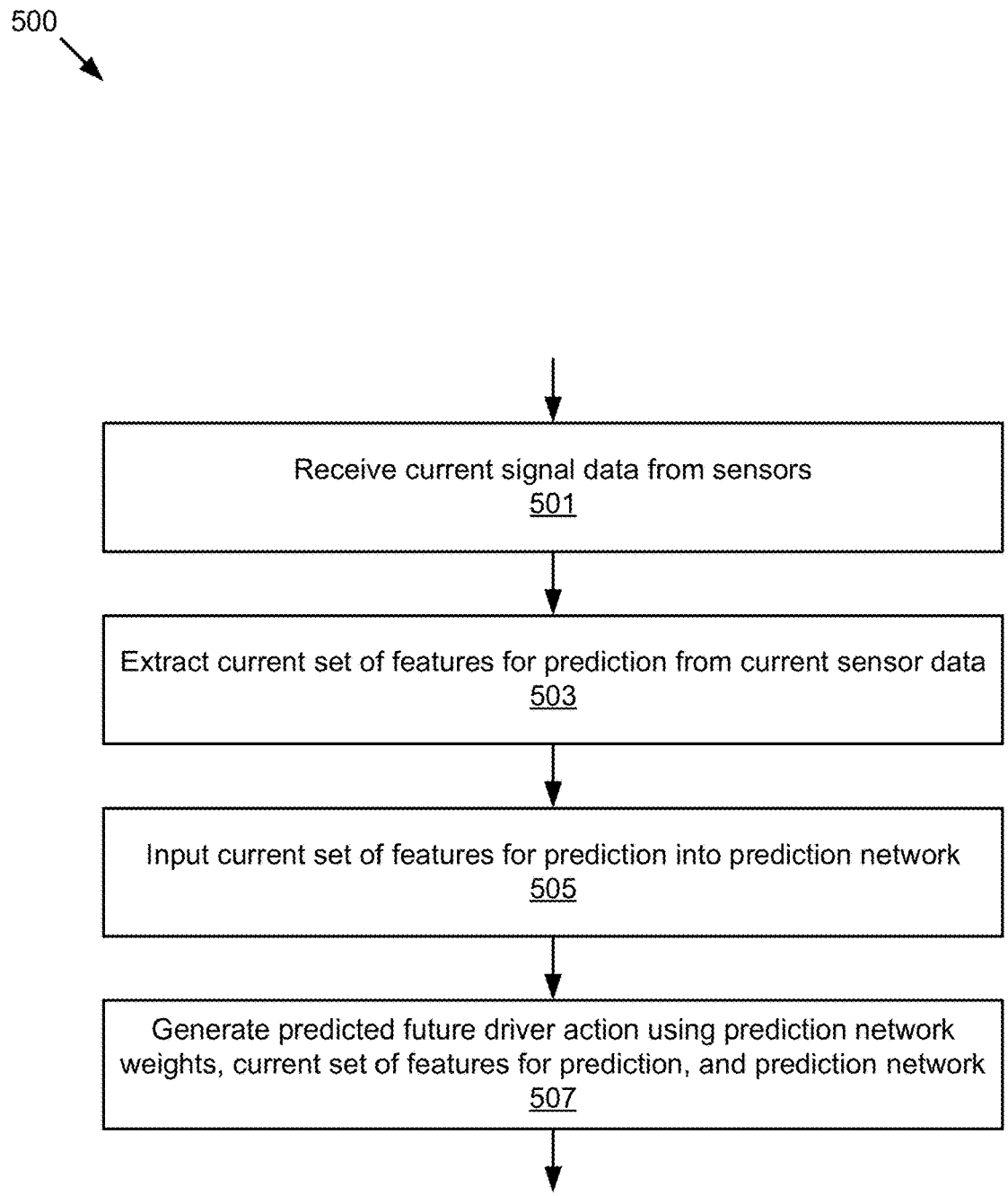
FIG. 5 is a flowchart of an example method for using the driver action prediction engine to anticipate future driver behavior.

FIG. 5 is a flowchart of an example method 500 for using the driver action prediction engine 105 to anticipate future driver behavior. At 501, the sensor data processor 251 and/or the feature extraction processor(s) 253 may receive current sensor data from one or more sensors 103. Current sensor data may be data that is provided by sensor(s) 103 upon detection, data collected over a recent period of time (e.g., past N records), data refreshed on a clock cycle, etc. For instance, the current sensor data may be received in real-time from the sensors 103 and/or the sensor data store 113, for example, the current sensor data may include data describing characteristics, environment, user actions, etc., of a vehicle (e.g., the moving platform 101) in motion at a present time. In some implementations, the driver action prediction engine 105 is electronically communicatively coupled to the one or more sensors 103 to optimize the speed at which the sensor data is received, although other variations are also possible, such as those including intervening components in implementations when signal speed may be acceptably lower.

At 503, the feature extraction processor(s) 253 may extract a current set of features for prediction from the current sensor data and, at 505, the action prediction processor 257 may input the current set of features for prediction into the prediction network 705. The current set of features may describe the vehicle in motion at a present time.

At 507, the action prediction processor 257 may generate a predicted future driver action using the one or more prediction network weights (e.g., as trained by the training processor 259), the current set of features for prediction, and the prediction network 705, for example, as described in reference to FIG. 7A.

Figure 6:
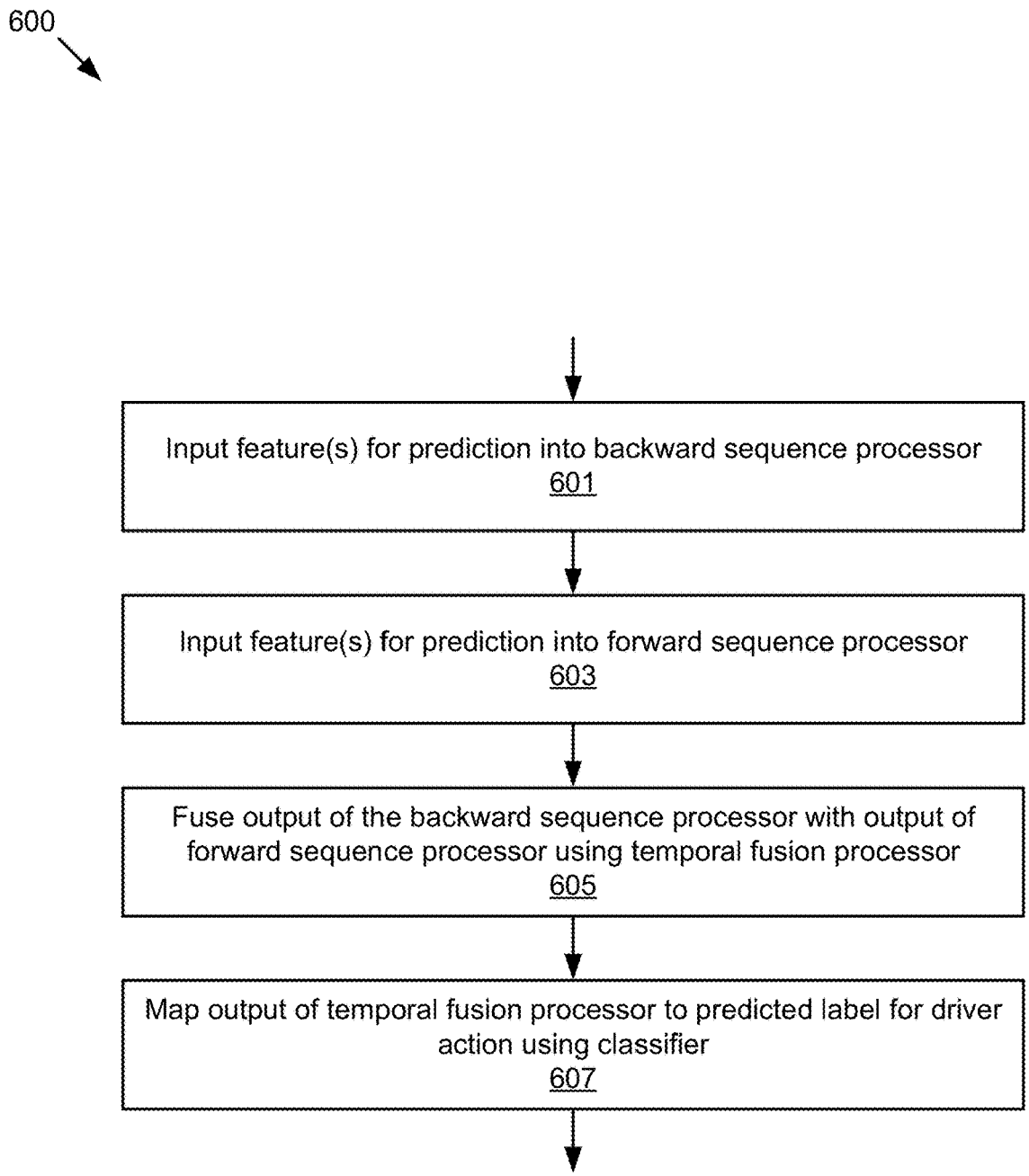
FIG. 6 is a flowchart of an example method for generating a predicted future driver action using a prediction network.

FIG. 6 is a flowchart of an example method 600 for generating predicted future driver action(s) using a prediction network 705. At 601, the action prediction processor 257 may input feature(s) for prediction into a backward sequence processor 711 and, at 603, the action prediction processor 257 may input the feature(s) for prediction into a forward sequence processor 709, as shown and described in further detail in reference to FIG. 7A.

At 605, the action prediction processor 257 may fuse an output of the backward sequence processor 711 with an output of the forward sequence processor 709 using a temporal sequence processor 713. In some implementations, fusing the output of the backward sequence processor 711 with the output of the forward sequence processor 709 may include generating, by the temporal fusing processor 713, a temporal representation of a temporal sequence of the output of the backward sequence processor 711 and a temporal sequence of the output of the forward sequence processor 709.

At 607, the action prediction processor 257 may map an output of the temporal fusion processor 713 to a predicted label for a driver action using a classifier 715, as described in further detail elsewhere herein.

FIG. 7A is a block diagram including an example implementation of a prediction network 705. At 701, the sensor data processor 251 and/or the feature extraction processor(s) 253 may receive sensor data from the sensors 103 and at 703, the feature extraction processor(s) 253 extracts feature(s) for prediction and, in some instances, feature(s) for recognition, from the sensor data. In some implementations, the sensor data may include causal factor(s) that may result in the user action.

The action prediction processor 257 may input the feature(s) for prediction into the prediction network 705. As described above, the prediction network 705 may be an algorithmic model component of the action prediction processor 257, which may predict impending user action before the action takes place using features for prediction extracted from sensor data. In some implementations, the prediction network 705 uses a deep (e.g., bidirectional) recurrent neural network (RNN) to perform temporal fusion of sensor data or features for prediction extracted from the sensor data.

In some implementations, the prediction network 705 may include a forward sequence processor 709, a backward sequence processor 711, a temporal fusion processor 713, and a classifier 715. Each processor 709, 711, and 713 may comprise one or more cascaded recurrent neural network units or RNN cells 707. Each of the RNN cells 707a, 707b, 707c, 707d, 707e, and/or 707n may be, for example, a basic RNN, long-short time memory (LSTM) RNN, or a gated RNN unit (GRU) cell.

The use of the deep bidirectional RNN structure (e.g., the use of both the forward sequence processor 709 and the backward sequence processor 711) can be beneficial, because it ensures temporal fusion of sensor data, thereby extending the prediction horizon beyond what is obtainable in the current state of the art. For example, some past techniques only process incoming sequences of data in a single direction using unidirectional LSTM units, so the system performance is limited in terms of prediction accuracy over a long horizon.

During training (e.g., retroactive training, as described elsewhere herein), because complete temporal context is available, the forward sequence processor 709 and the backward sequence processor 711 may process the input sequence (e.g., the sequence of features for prediction) in reverse order. Accordingly, the forward sequence processor 709 and the backward sequence processor 711 may have different representations of the sensor data based on the direction of their operation, in some implementations. During deployment (e.g., prediction of driver action, as in the example of FIG. 3A) the same input vector (e.g., the features for prediction and/or the sensor data may be represented as a vector) may be processed through the forward sequence processor 709 and the backward sequence processor 711. For example, during deployment, the forward sequence processor 709 may process the input vector in forward order and the backward sequence processor 711 may process a delayed version of the input vector (e.g., the same data input into the forward sequence processor 709) in reverse order.

The ability for the input vector to be processed through the forward sequence processor 709 and the backward sequence processor 711 in different directions during training and during deployment is a further benefit of various implementations described herein. Whereas double RNNs (e.g., LSTM) may be used in some past technologies to achieve spatial sensor data fusion (e.g., one RNN may process in-car data while a second RNN processes environmental data), some implementations of the techniques described herein may be connected in a bidirectional version used for temporal sensor data fusion. Similarly, some implementations of the forward sequence processor 709 and the backward sequence processor 711 may share the responsibility of spatially fusing sensor data, unlike various other solutions described in the Background which use dedicated RNN units.

The temporal fusing processor 713 may fuse sensor data temporally (e.g., rather than being limited to spatial sensor data fusion), thereby allowing the future sensor data to be incorporated into the weights of the backward sequence processor 709. This can beneficially improve prediction accuracy and horizon over past technologies where only spatial sensor data fusion is used. In some cases, the prediction network 705 may use the forward sequence processor 709, the backward sequence processor 711, and the temporal fusion processor 713 to learn temporal correlations in an input sequence (e.g., a sequence of sensor data/features for prediction). The capability to fuse sensor data temporally using the techniques described herein beneficially allows the driver action prediction engine 105 to be used with large feature sizes and high sampling rates, thereby improving accuracy and prediction horizon.

In some implementations, the output of the temporal fusion processor 713 may be mapped to a predicted driver action using a classifier 715. In some implementations, the classifier 715 may include a Logit 717 (e.g., a logistic regression unit) and either a Sigmoid or Softmax layer 719, although other types are also possible, contemplated, and applicable. In an example, Softmax 719 may be used to predict the most probable of a set of mutually exclusive driver actions while Sigmoid may be used to determine the probabilities of a set of non-mutually exclusive driver actions. The classifier 715 may output a predicted label 721, which may represent a predicted future driver action or event if the sensor data is in real-time (or substantially in real-time) or may represent a predicted driver action for training, if the sensor data is for a past time (e.g., if the predicted driver action has already occurred). In some implementations, the predicted label may also include probabilities for the predicted actions, predicted time(s) that those actions will occur (e.g., a range of seconds, minutes, etc.), etc.

Figure 7B:
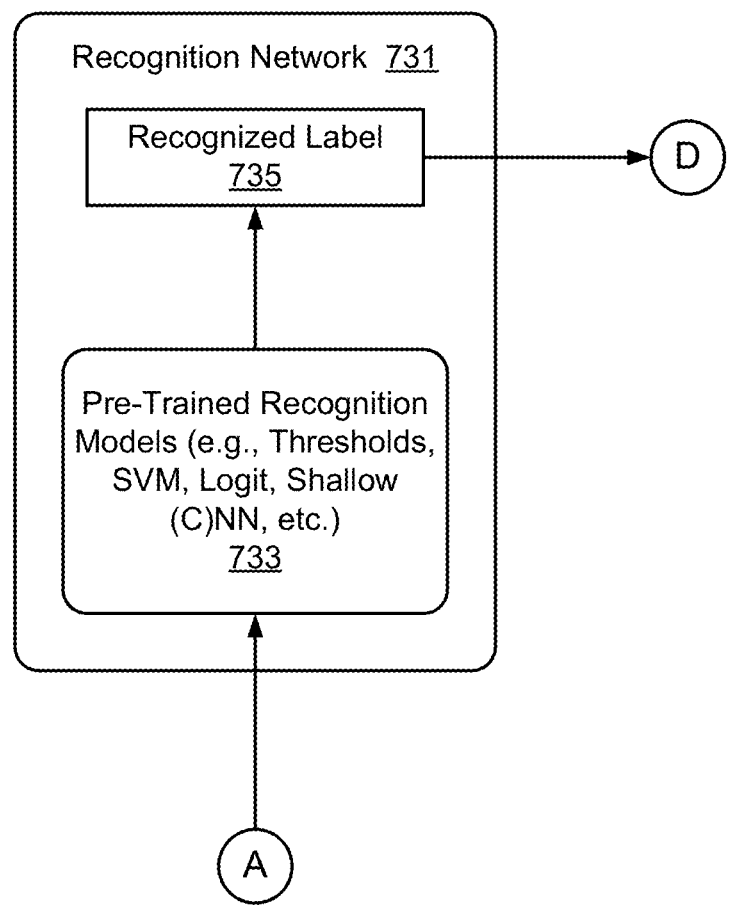
FIG. 7B is a block diagram of an example recognition network.

FIG. 7B is a block diagram of an example implementation of a recognition network 731. As described above, the recognition network 731 may be an algorithmic model component of the action recognition processor 257, which may recognize or detect driver actions from the features for recognition extracted from the sensor data (e.g., as described at 701 and 703 of FIG. 7A). The output of the recognition network 731 may serve as targets or labels (e.g., a recognized label 735) for training the weights of the prediction network 705. Accordingly, the recognition network 731 can allow the driver action prediction engine 105 to predict an arbitrary driver action without human interaction (e.g., hand labeling training data for prediction).

Some actions (e.g., actions taken by a user and/or environmental factors influencing those actions), such as pedal positions, steering, turn signal, etc., may be directly observable; however some other actions, such as actual turn, lane changes, drowsiness, head pose, attentiveness, etc., might require additional processing. The recognition network 731 described herein may be configured to detect both the basic actions (e.g., those directly observable) and higher order actions (e.g., those actions requiring additional processing, as described above). It should be noted that while not always required, in some cases, it may be beneficial to directly sense actions of interest directly using sensors which are dedicated to sensing those actions to improve performance. The performance of the recognition network 731 may limit the overall performance of the driver action prediction engine 105, so it may be beneficial to directly sense actions and/or provide oversight over threshold levels of errors.

In some implementations, the actions recognized by the recognition network 731 may take place either in the moving platform 101 of interest, in other moving platforms 101, and/or roadside infrastructure. For example, other moving platforms 101 and/or roadside infrastructure may have sensors 103 that directly sense actions of a user and may also provide an action recognition service. The recognized action information from the other moving platforms 101 or roadside infrastructure may be provided to the moving platform 101 of interest and/or to the driver action prediction engine 105 through V2V or V2I communications.

In some implementations, the recognition network 731 includes one or more pre-trained recognition models 733. For example, the recognition network 731 may include a variety of simple pre-trained models, such as calibrated sensor value threshold, logistic regression, support vector machine, shallow multi-layer perception, shallow convolutional neural network, and so on. In some implementations, the recognition network 731 may use pre-trained driver action recognition models, because they may be directly sensed by the moving platform 101 of interest, other moving platforms 101, or infrastructures, and substantially simplifies driver action recognition over past attempts.

The pre-trained recognition models described above may output a recognized label 735 for use by other components of the driver action prediction engine 105, such as the training processor 259.

Figure 7C:
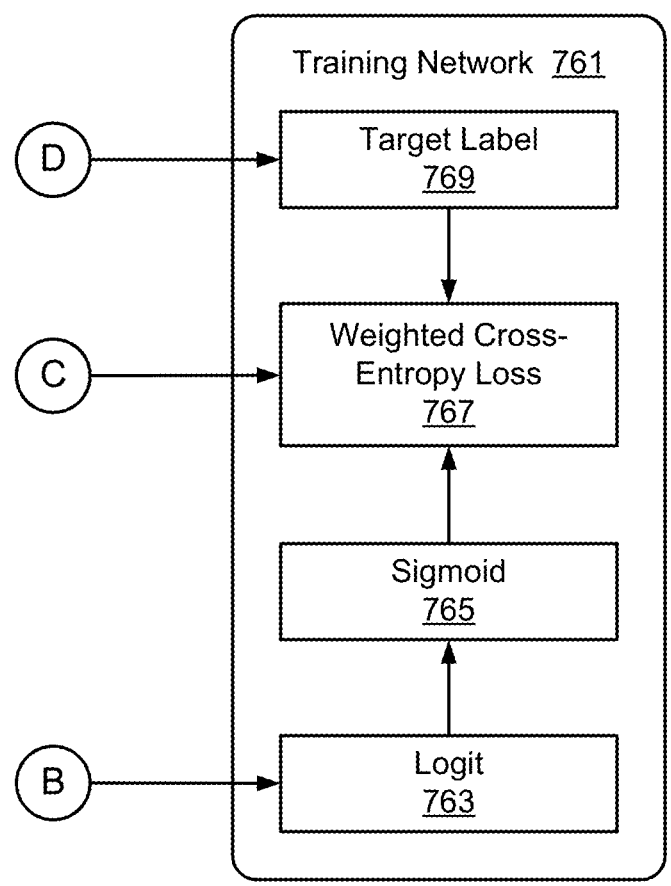
FIG. 7C is a block diagram of an example training network.

FIG. 7C is a block diagram of an example implementation of a training network 761. As described above, the training network 761 may include an algorithmic model component of the training processor 259, which may train one or more of the components of the driver action prediction engine 105, such as the prediction network 705. In some implementations, the training network 761 may include a Logit function 763, a Sigmoid function 765, a weighted cross-entropy loss function 767, and target label(s) 769. These components may be configured to train the weights of the prediction network 705 and/or the parameters of the training network 761, for example.

In some implementations, the training network 761 accepts, as input, the outputs of the temporal fusion processor 713, the classifier 715 (e.g., the predicted label 721), and/or the recognition network 731 (e.g., the recognized label 735). It should be noted that, although the proposed prediction network 705 can be trained with human generated labels for driver actions, one of the benefits of some implementations of the techniques described herein is that the driver action prediction engine 105 can easily train the prediction network 705 using the labels generated by the recognition network 731.

In some implementations, weights of the prediction network 705 are trained using the error between the outputs of the prediction network 705 (e.g., the predicted label 721) and the recognition network 731 (e.g., the recognized label 735). For example, this training may be performed using the truncated back-propagation through time algorithm, such as may be used in the art to train other deep neural networks with recurrent units.

In the implementation depicted in FIG. 7C, the training network 761 includes a loss weight branch that automatically determines how much the prediction network 705 should learn from the prediction error at any point in time. For example, the weighted cross-entropy loss function 767 may combine the target label 769 (e.g., from the recognized label 735) with the output of the temporal fusion processor 715 (e.g., processed through the Logit 763 and Sigmoid 765 functions) and the predicted label 721 to train the prediction network 705. This loss branch may allow the training network 761 to reject noisy input frames that might not contribute to determining the relationship between prediction network parameters and a recognized action.

Figure 8A:
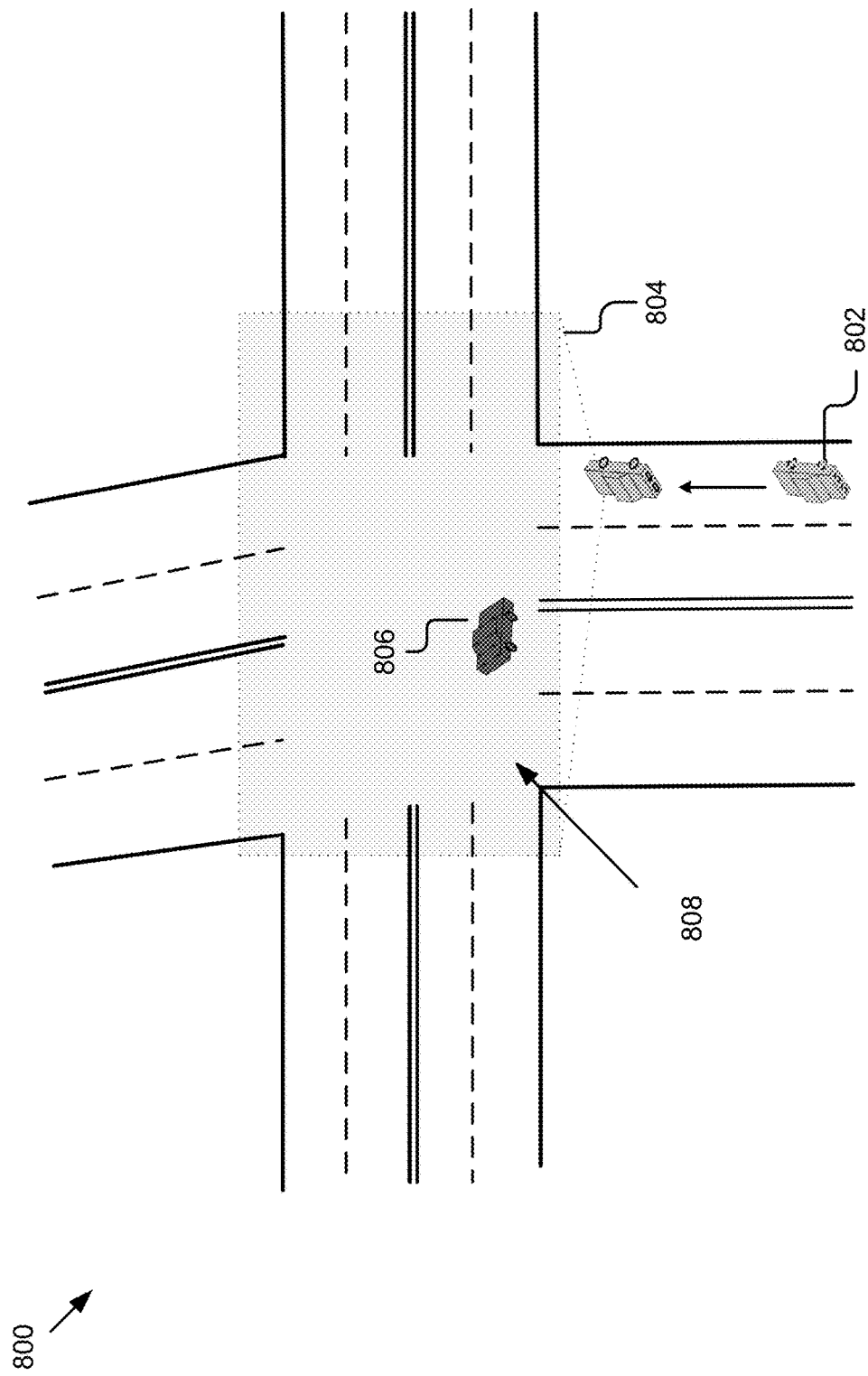
FIGS. 8A-E illustrate various different examples of sensor data.

FIGS. 8A-8E illustrate various different examples of sensor data. FIG. 8A in particular depicts a diagram 800 example image data that may be captured and provided by external sensor(s) of a moving platform 101. The image data illustrated in the figure include aspect(s) of the environment outside the moving platform 101. In the illustrated example, the moving platform 101, a vehicle 802, is moving north in a four-lane road with two lanes for traffic in each direction. Sensor(s) 103, for instance, front facing image sensor(s), may be installed in the vehicle 802 to monitor the road condition in front of the vehicle 802. Image data, represented by the grey box 804, may be captured at the moment when the vehicle 802 is approaching the intersection 808. The image data contains road traffic data in front the vehicle 802 at that moment, such as a series of frames depicting another vehicle 806 located in the intersection and moving eastward.

Figure 8B:
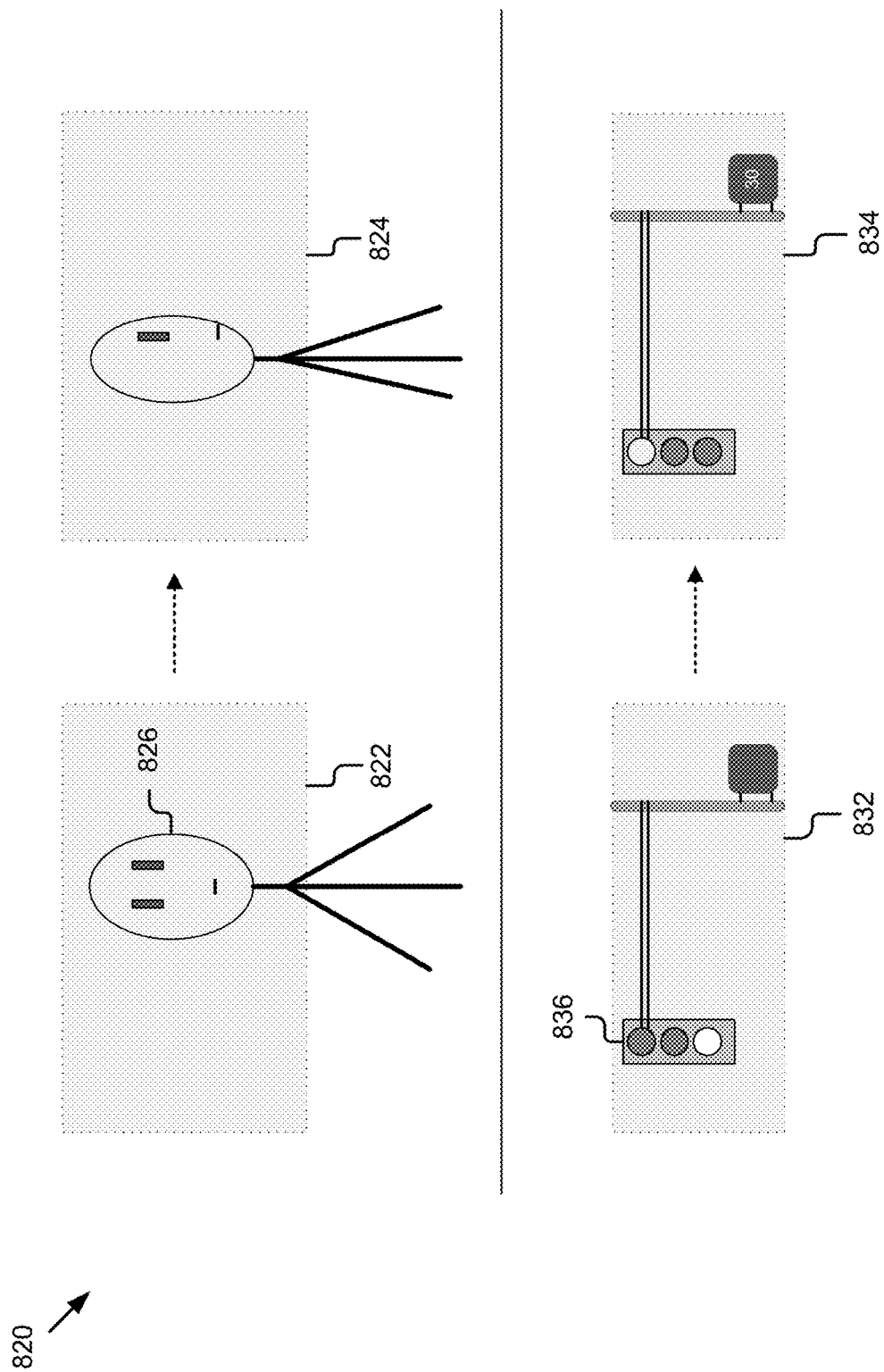

FIG. 8B depicts a diagram 820 of further examples of time-varying image data that may monitor the environments inside and/or outside of a moving platform 101. The image data may include a series of images taken at different times. For instance, the images indicated by the grey boxes 822 and 824 respectively represent two images taken sequentially at different times to monitor a driver's head 826 motions inside a vehicle. The difference between the images 822 and 824 indicates that the driver is turning his/her head left. For another example, grey boxes 832 and 834 respectively represent two images taken sequentially at different times to monitor traffic control signal outside a vehicle. The difference between the images 832 and 834 indicates that the traffic light signal 836 has just changed from green (as shown in the image 832) to red (as shown in the image 834).

Figure 8D:
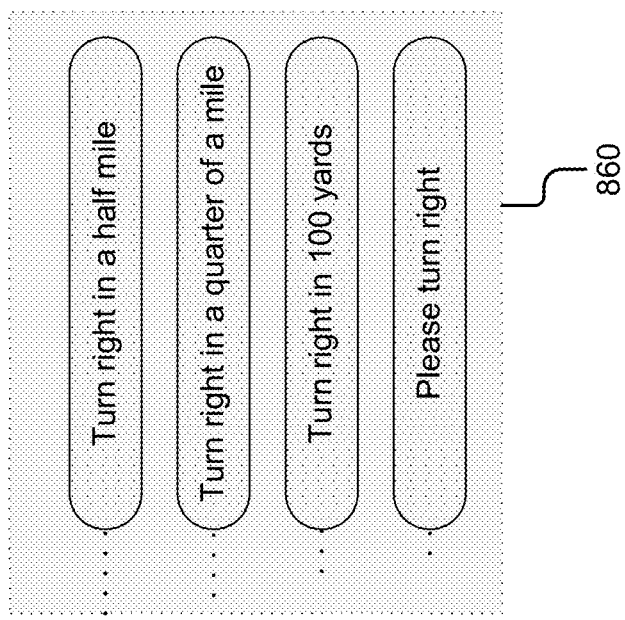
Figure 8C:
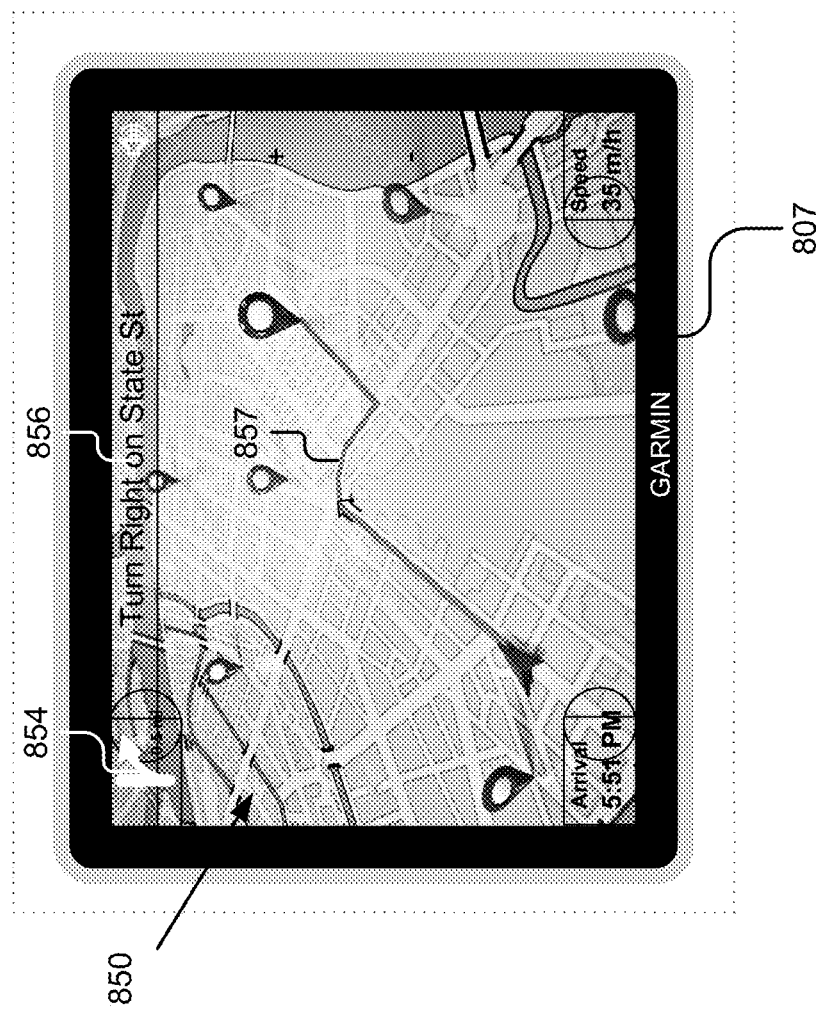

FIG. 8C depicts example sensor data, which includes navigation data that may be received from a location device, such as a GPS or other suitable geolocation unit, by the sensor data processor 232. In some implementations, the navigation application 107 may be operable by the location device to provide navigation instructions to a driver, although other variations of the navigation application 107 are also possible and contemplated, as discussed elsewhere herein.

As illustrated in the grey box 852 of FIG. 8C, the navigation data may include information regarding previous, current, and future locations of a moving platform 101. For instance, the navigation data may include information regarding current status of the moving platform 101, such as speed, direction, current road, etc. The navigation data may also include future positions of the moving platform 101 based on a mapped navigation path, intended destination, turn-by-turn instructions, etc. as 854, 856, 857, and 860 show. The navigation data may additionally or alternatively include map data, audio data, and other data as discussed elsewhere herein. FIG. 8D depicts example turn-by-turn instructions for a user 101, which may be related to a route displayed to the user. The instructions may be output visually and/or audibly to the user 115 via one or more output devices 221 (e.g., a speaker, a screen, etc.).

In some implementations, audio data received by the sensor data may include any sound signals captured inside and/or outside the moving platform 101. Non-limiting examples of audio data include a collision sound, a sound emitted by emergency vehicles, an audio command, etc. In some implementations, sensor data may include time-varying directions for the driver of a vehicle.

Figure 8E:
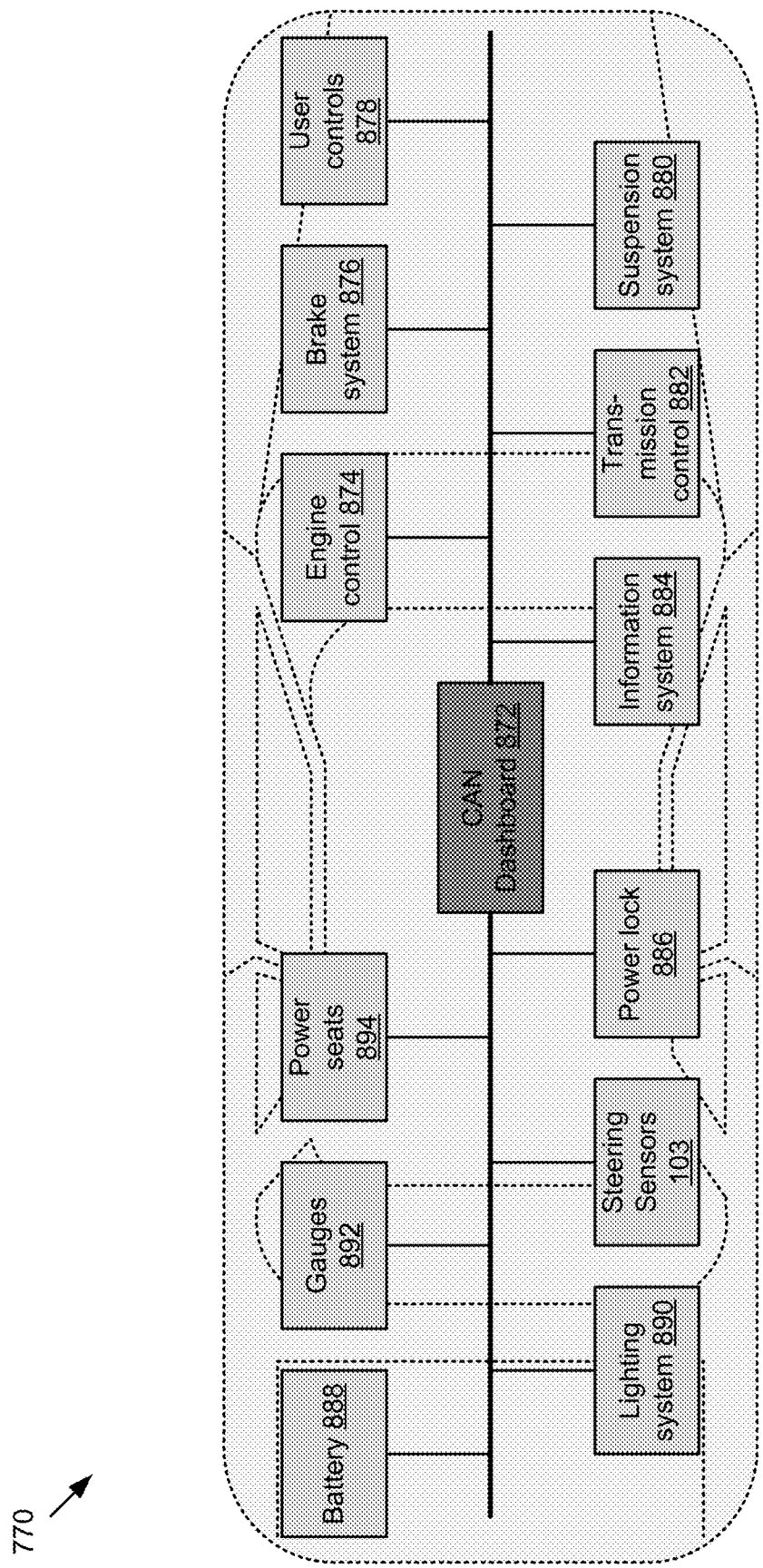

FIG. 8E depicts an example CAN network 870 from which CAN data may be extracted. The CAN network 870 may comprise one or more sensor sources. For instance, the CAN network 870, and/or non-transitory memory that stores data captured by it, may comprise a collective sensor source, or each of the constituent sets of sensors 103 (e.g., 874, 876, 878, etc.) included in the network 870 may each comprise sensor sources.

The CAN network 870 may use a message-based protocol that allows microcontrollers and devices to communicate with each other without a host computer. The CAN network 870 may convert signals to data that may be stored and transmitted to the sensor data processor 232, an ECU, a non-transitory memory, and/or other ADA system 100 components. Sensor data may come from any of the microcontrollers and devices of a vehicle, such as user controls 878, the brake system 876, the engine control 874, the power seats 894, the gauges 892, the batter(ies) 888, the lighting system 890, the steering and/or wheel sensors 103, the power locks 886, the information system 884 (e.g., audio system, video system, navigational system, etc.), the transmission control 882, the suspension system 880, etc.

In addition or alternatively to the example sensor data discussed with reference to FIGS. 8A-E, it should be understood that numerous other types of sensor data may also be used, such as electronic message data, other sensor data, data from other moving platforms 101, data from predefined systems, etc. For instance, sensor data received by a vehicle may include an electronic message data received from another incoming vehicle from the opposite direction, informing a planned/anticipated left turn in seconds.

Figure 9A:
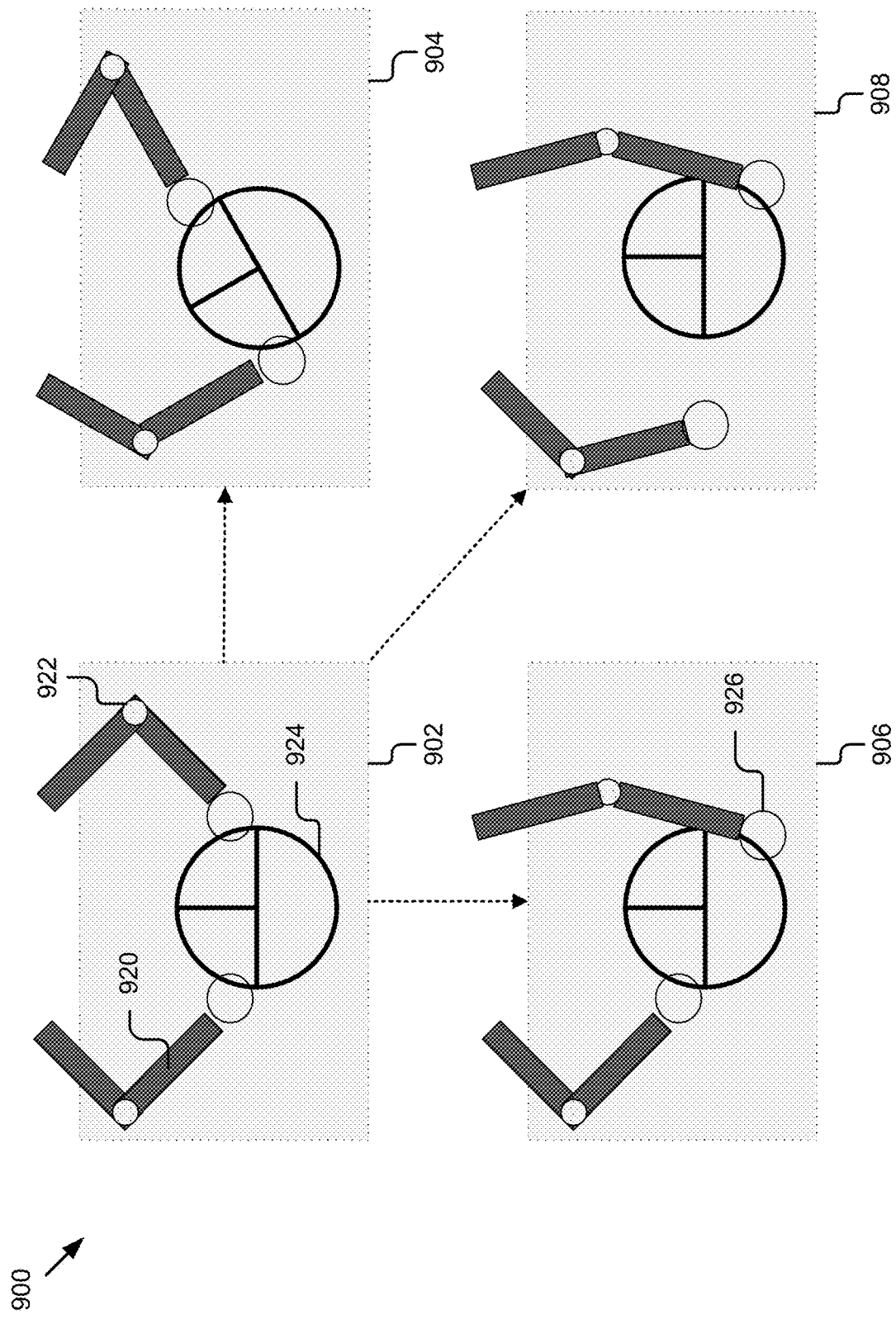
FIGS. 9A-B illustrate example factors affecting driver behavior modeling.
Figure 9B:
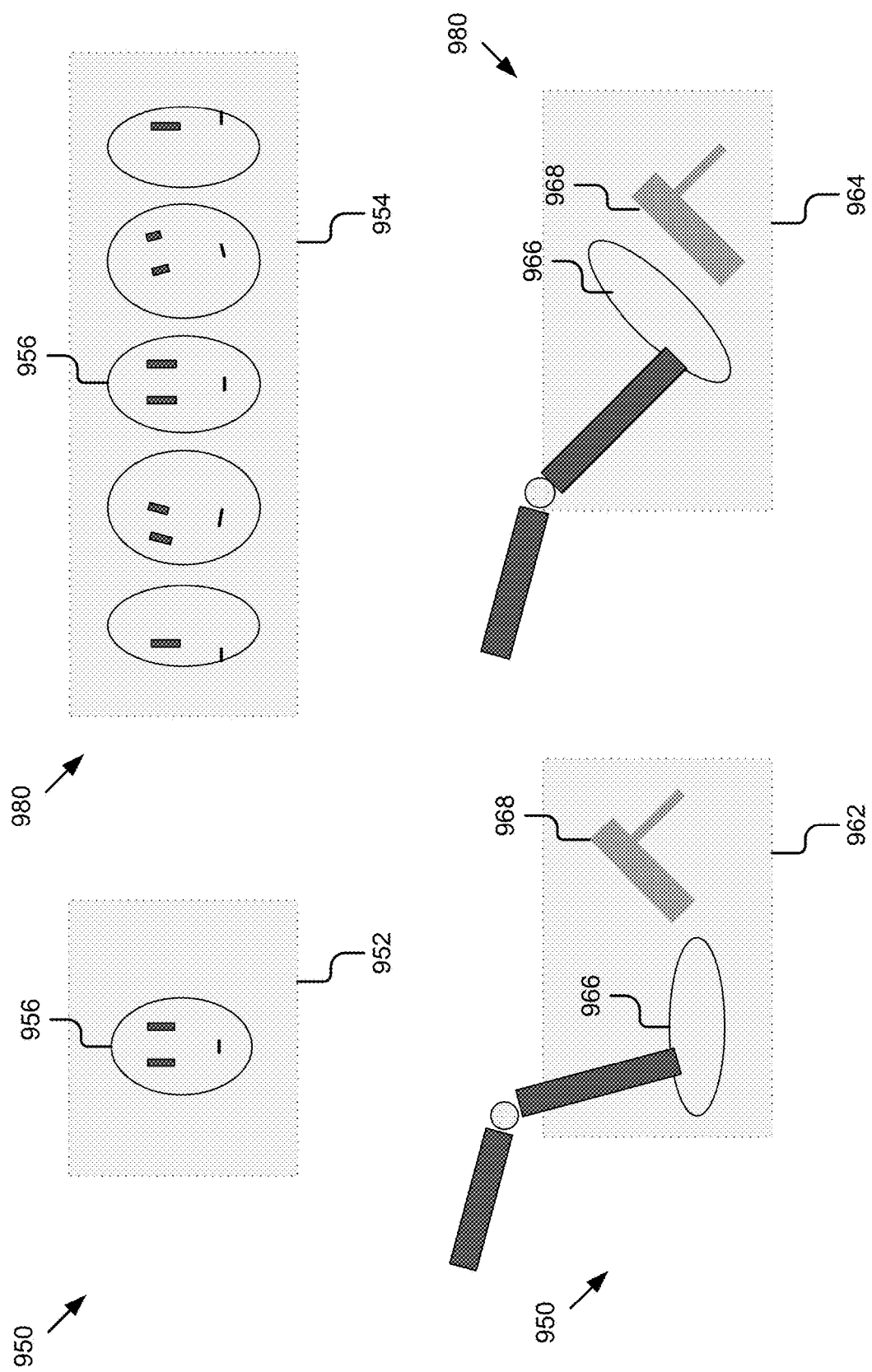

FIGS. 9A-9B illustrate examples of factors affecting driver behavior modeling. FIG. 9A illustrates an example of different steering habits 900 of different drivers. Image 902 shows an example of a general posture for a driver operating a steering pedal when a vehicle is moving forward. Both the left arm 922 and the right arm 920 of the driver are equally positioned (e.g., hands at 10 and 2) on the steering wheel 924. Images 904, 906, and 908 show different driver patterns in operating the steering wheel when making a left turn. For instance, in the image 904, a driver may turn the vehicle left by moving his/her arms to rotate the steering pedal 924 without repositioning his/her hands on the steering wheel 924. In contrast, in images 906 and 908, the driver may reposition his/her hand(s) prior to turning the wheel. For instance, in image 906, a driver may first move his/her left hand 926 forward around the steering wheel 924, and then pull his/her left arm 922 back in preparation to rotate the steering wheel. In image 908, a driver may remove a hand and/or reposition a hand on the steering wheel 924.

In some implementations, the driver action prediction engine 105 may be trained to recognize the patterns shown in FIG. 9A, such as images 906 and 908, and may be able to predict a future left turn based on the patterns. The driver action prediction engine 105 may then be adapted to different user habits to accurately anticipate future outcomes, such as driver behavior.

FIG. 9B depicts an example showing the effect environment familiarity may have on a user's driving behavior. Images 952 and 962 may capture a user's activity in a familiar environment 950. In this environment 950, the user may keep his/her head 956 relatively still, and his/her right foot 966 may be at rest away from the brake 968.

In contrast, images 954 and 964 may capture a user's activity in an unfamiliar environment 980. For instance, as shown, the user may keep moving his/her head 956 around to check the surrounding environment (e.g., road signals, street name, exits, etc.), as illustrated in the image data 954. Additionally or alternatively, the user may move his/her right foot 966 closer to the brake pedal 968, or place his/her right foot above the brake pedal 968, as shown in image data 964. This foot gesture may indicate an immediate braking action in a familiar environment, and the head movement may similarly indicate a left or right turn in an unfamiliar environment 980.

The driver action prediction engine 105 may correlate driver patterns with environment familiarity, such as the patterns and familiarity discussed above, when determining patterns from sensor data. Additionally, during a training process, the components of the driver action prediction engine 105 may be adapted to consider the patterns in context, such as familiar and unfamiliar environments.

Figure 10A:
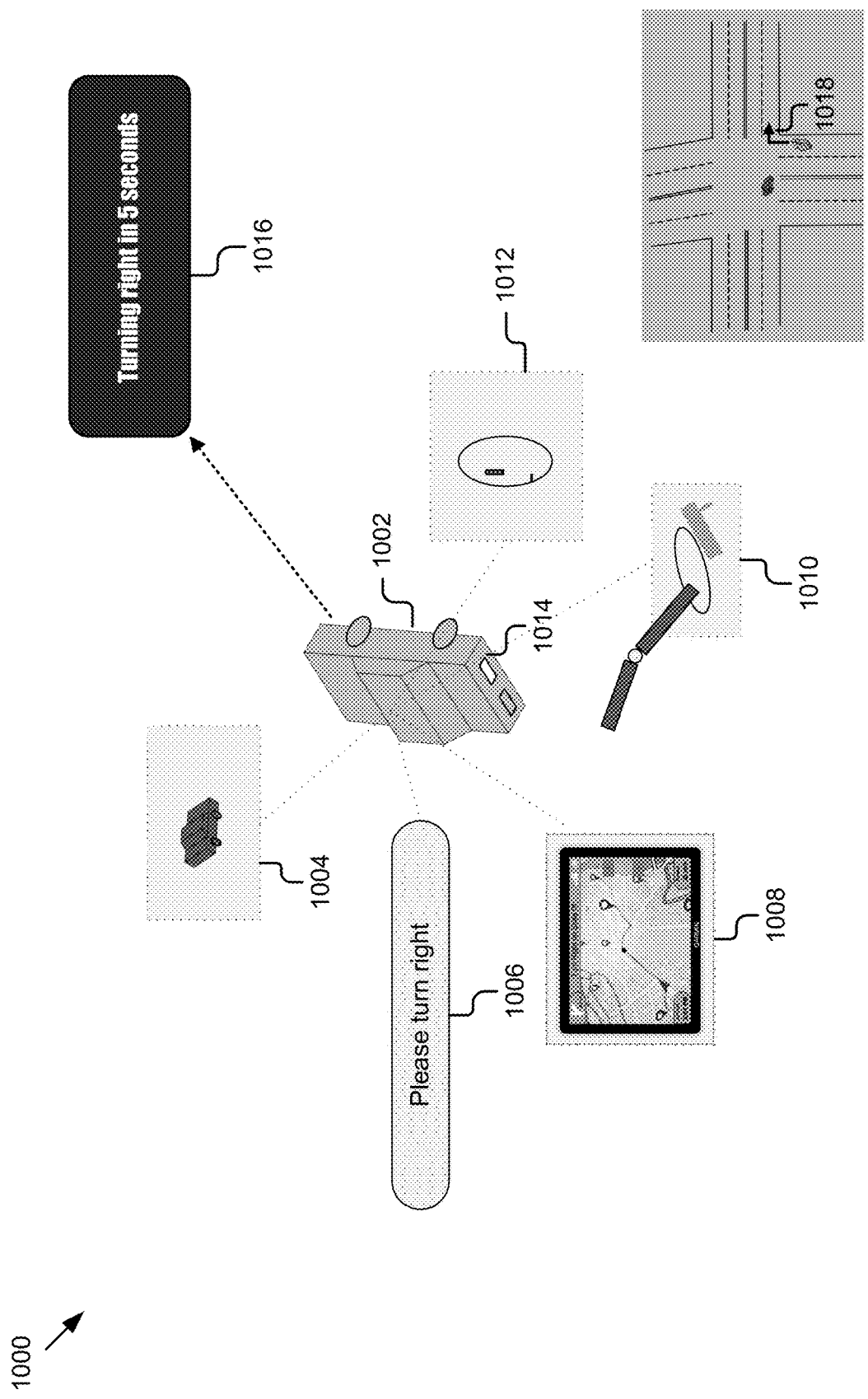
FIGS. 10A and 10B illustrate examples of generating predicted driver actions.
Figure 10B:
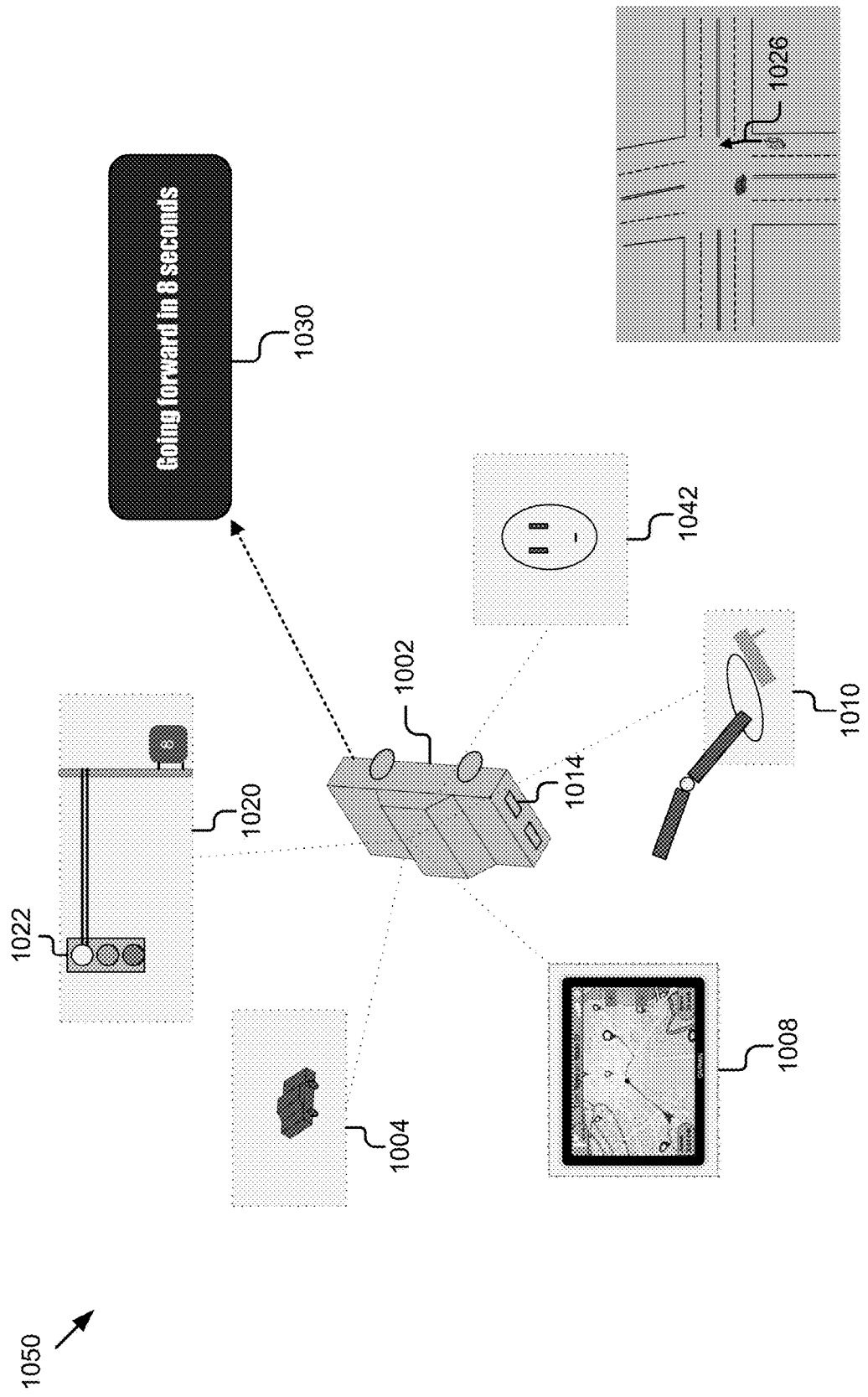

FIGS. 10A and 10B illustrate examples of generating predicted driver action(s). In FIG. 10A, a vehicle 1002 is approaching an intersection. Sets of sensors 103 may capture multiple sets of sensor data while the vehicle 1002 is approaching the intersection. The sensor data may include image data 1004 showing another vehicle is moving east in the intersection, GPS data 1006 and 1008 may reflecting the vehicle's route relative to the vehicle's position, image data 1010 capturing right foot of a user 115 on the brake pedal of the vehicle, image data 1012 capturing left road-check of the user 115 by moving his/her head, and CAN data 1014 showing the right indicator of the vehicle 1002 is active. The consideration of multiple modalities by the driver action prediction engine 105, such as the foregoing modalities, may improve prediction accuracy. For instance, without the image data 1004, the driver action prediction engine 105 may, using the methods discussed herein, generate a predicted future driver action indicating the user 115 will make a right turn at 4 seconds. In contrast, with the image data 1004, the driver action prediction engine 105 may generate a predicted future driver action that the user 115 may make a right turn in 5 seconds, which is determined based on the time required by the vehicle in the image data 1004 to pass the intersection, which may be learned through a training process. In some implementations, the ADA system 100 may implement an action based on the predicted driver action, such as adapt the suspension of the vehicle for the turn at the predicted time, provide more accurate navigation instructions (e.g., turn by turn instructions), etc.

In FIG. 10B, the vehicle 1002 is approaching the intersection. Sets of sensors 103 may capture multiple sets of sensor data while the vehicle 1002 is approaching the intersection. The sensor data may include image data 1004 showing another vehicle is moving east in the intersection, GPS data 1008 showing the route directions, image data 1010 capturing right foot of the user 115 on the brake pedal, image data 1042 capturing the user looking ahead, and image data 1020 showing a red light 1022. Based on previous training and learning performed during prior iterations, the driver action prediction engine 105 may generate a predicted driver action that the user 115 will start to move forward at a certain based on the received multiple set of the sensor data. The time may be determined based on the amount of time it has taken in prior iterations or training for the red light to turn. The ADA system 100 may implement actions in association with the anticipation, such as to start the vehicle and/or various systems, adapt the suspension, shift gears, provide updated navigation instructions, etc.

Some implementations of the systems and techniques described herein describe an efficient driver action prediction system based on temporal fusion of sensor data using deep (bidirectional) recurrent neural network. These systems and techniques may provide earlier predictions with higher accuracy than past technologies. The systems and techniques take advantage of training a prediction network 705 using results from a recognition network 731, provide access to more sensing modalities, provide better scalability, etc. In some instances, the driver action prediction system described herein provides direct access to stored sensor data, so that the prediction network 705 can be built later off of more than just the instantaneous results from a recognition network 731. Further, the techniques described herein do not assume that sensor features are relevant for both prediction and recognition. The combination of the elements described herein provide numerous advantages over some past technology.

Some implementations of the proposed driver action prediction system described herein may provide one or more of the illustrated benefits, such as very high recognition accuracy, a long prediction horizon, very high prediction accuracy, moderate complexity, both online and offline training options, flexibility, and a high number of sensory inputs. These numerous advantages over other forms of computer learning are may be important in a moving platform 101 environment where small deviations, errors, or delays can lead to personal or property damage.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that may receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein may take the form of an entirely hardware implementation, an entirely software implementation, or implementations containing both hardware and software elements. For instance, the technology may be implemented in software, which includes but is not limited to firmware, resident software, microcode, etc. Furthermore, the technology may take the form of a computer program product accessible from a computer-usable or computer-readable medium providing program code for use by or in connection with a computer or any instruction execution system. For the purposes of this description, a computer-usable or computer readable medium may be any non-transitory storage apparatus that may contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements may include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, processors, routines, features, attributes, methodologies and other aspects are not mandatory or significant, and the mechanisms that implement the specification or its features may have different names, divisions and/or formats.

Furthermore, the modules, processors, routines, features, attributes, methodologies and other aspects of the disclosure may be implemented as software, hardware, firmware, or any combination of the foregoing. Also, wherever a component, an example of which is a module, of the specification is implemented as software, the component may be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   receiving, by one or more computing devices, stored sensor data, the stored sensor data describing characteristics of a vehicle in motion at a past time;
   extracting, by the one or more computing devices, features for prediction and features for recognition from the stored sensor data;
   inputting, by the one or more computing devices, the features for prediction into a prediction network, the prediction network including a classifier and a temporal fusion processor;
   generating, by the one or more computing devices, a predicted label for a past driver action based on the features for prediction using an output of the temporal fusion processor and the classifier of the prediction network;
   inputting, by the one or more computing devices, the features for recognition into a recognition network, the recognition network including one or more trained recognition models that recognize user actions based on the extracted features for recognition;
   generating, by the one or more computing devices, a recognized label for the past driver action based on the features for recognition using the recognition network; and
   training, by the one or more computing devices, one or more prediction network weights of the prediction network including automatically inputting the predicted label generated by the prediction network and the recognized label generated by the recognition network into a training network and using an error between the recognized label and the predicted label, the predicted label being generated using the classifier of the prediction network and the output of the temporal fusion processor.

2. The computer-implemented method of claim 1, wherein the prediction network includes one or more recurrent neural networks.

3. The computer-implemented method of claim 1, further comprising:
   receiving, by the one or more computing devices, current sensor data from one or more sensors, the one or more computing devices being electronically communicatively coupled to the one or more sensors, the current sensor data including data describing characteristics of the vehicle in motion at a present time;
   extracting, by the one or more computing devices, a current set of features for prediction from the current sensor data;
   inputting, by the one or more computing devices, the current set of features for prediction into the prediction network; and
   generating, by the one or more computing devices, a predicted future driver action using the one or more prediction network weights, the current set of features for prediction, and the prediction network.

4. The computer-implemented method of claim 1, wherein generating the predicted label for the past driver action based on the features for prediction using the prediction network includes
   inputting, by the one or more computing devices, the features for prediction into a backward sequence processor, and
   inputting, by the one or more computing devices, the features for prediction into a forward sequence processor.

5. The computer-implemented method of claim 4, wherein generating the predicted label for the past driver action based on the features for prediction using the prediction network includes
   fusing, by the one or more computing devices, an output of the backward sequence processor with an output of the forward sequence processor using the temporal fusion processor, and
   mapping, by the one or more computing devices, an output of the temporal fusion processor to the predicted label for the past driver action using the classifier.

6. The computer-implemented method of claim 5, wherein fusing the output of the backward sequence processor with the output of the forward sequence processor includes generating, by the temporal fusion processor operable on the one or more computing devices, a temporal representation using a temporal sequence of the output of the backward sequence processor and a temporal sequence of the output of the forward sequence processor.

7. The computer-implemented method of claim 1, wherein generating the recognized label for the past driver action includes inputting, by the one or more computing devices, the features for recognition into one or more pre-trained driver action recognition models.

8. The computer-implemented method of claim 1, wherein training the one or more prediction network weights of the prediction network includes
   inputting the error into a truncated back-propagation through time algorithm.

9. A computer system comprising:
   one or more computer processors; and
   one or more non-transitory memories storing instructions that, when executed by the one or more computer processors, cause the computer system to perform operations comprising:
   receiving stored sensor data, the stored sensor data describing characteristics of a vehicle in motion at a past time;

extracting features for prediction and features for recognition from the stored sensor data;

inputting the features for prediction into a prediction network, the prediction network including a classifier and a temporal fusion processor;

generating a predicted label for a past driver action based on the features for prediction using an output of the temporal fusion processor and the classifier of the prediction network;

inputting the features for recognition into a recognition network, the recognition network including one or more trained recognition models that recognize user actions based on the extracted features for recognition;

generating a recognized label for the past driver action based on the features for recognition using the recognition network; and training one or more prediction network weights of the prediction network including automatically inputting the predicted label generated by the the prediction network and the recognized label generated by the recognition network into a training network and using an error between the recognized label and the predicted label, the predicted label being generated using the classifier of the prediction network and the output of the temporal fusion processor.

10. The computer system of claim 9, wherein the prediction network includes one or more recurrent neural networks.

11. The computer system of claim 9, wherein the operations further comprise:

receiving current sensor data from one or more sensors, the computer system being electronically communicatively coupled to the one or more sensors, the current sensor data including data describing characteristics of the vehicle in motion at a present time;

extracting a current set of features for prediction from the current sensor data;

inputting the current set of features for prediction into the prediction network; and generating a predicted future driver action using the one or more prediction network weights, the current set of features for prediction, and the prediction network.

12. The computer system of claim 9, wherein generating the predicted label for the past driver action based on the features for prediction using the prediction network includes inputting the features for prediction into a backward sequence processor, and inputting the features for prediction into a forward sequence processor.

13. The computer system of claim 12, wherein generating the predicted label for the past driver action based on the features for prediction using the prediction network includes fusing an output of the backward sequence processor with an output of the forward sequence processor using the temporal fusion processor, and mapping an output of the temporal fusion processor to the predicted label for the past driver action using the classifier.

14. The computer system of claim 13, wherein fusing the output of the backward sequence processor with the output of the forward sequence processor includes generating, by the temporal fusion processor, a temporal representation using a temporal sequence of the output of the backward sequence processor and a temporal sequence of the output of the forward sequence processor.

15. The computer system of claim 9, wherein generating the recognized label for the past driver action includes inputting the features for recognition into one or more pre-trained driver action recognition models.

16. The computer system of claim 9, wherein training the one or more prediction network weights of the prediction network includes inputting the error into a truncated back-propagation through time algorithm.

17. A computer system comprising:

one or more sensors providing sensor data;

one or more non-transitory computer memories for storing and providing access to data;

one or more computer processors coupled to the one or more non-transitory computer memories to store and receive data;

a feature extraction processor storable by the one or more non-transitory computer memories and executable by the one or more computer processors, the feature extraction processor configured to extract features for recognition from the sensor data and transmit the features for recognition to an action recognition processor, the feature extraction processor configured to extract features for prediction from the sensor data and transmit the features for prediction to an action prediction processor;

the action recognition processor storable by the one or more non-transitory computer memories and executable by the one or more computer processors, the action recognition processor configured to generate, by a recognition network, a recognized label for a past user action based on the features for recognition and transmit the recognized label to a training processor;

the action prediction processor storable by the one or more non-transitory computer memories and executable by the one or more computer processors, the action prediction processor configured to generate, by a prediction network, a predicted label for the past user action based on the features for prediction using an output of a temporal fusion processor and a classifier of and transmit the predicted label to the training processor, the prediction network including the classifier and the temporal fusion processor; and the training processor storable by the one or more non-transitory computer memories and executable by the one or more computer processors; the training processor configured to train, by a training network, one or more prediction network weights of the action prediction processor including automatically inputting the predicted label generated by the classifier of the prediction network and the recognized label generated by the recognition network into the training network and using an error between the recognized label and the predicted label, the predicted label being generated using the classifier of the prediction network and the output of the temporal fusion processor.

18. The computer system of claim 17, wherein the prediction network includes one or more recurrent neural networks.

19. The computer system of claim 17, wherein the prediction network includes a forward sequence processor, a backward sequence processor, and the temporal fusion processor.

20. The computer system of claim 19, wherein each one of the forward sequence processor, the backward sequence processor, and the temporal fusion processor includes a plurality of recurrent neural network cells.

* * * * *